(12) United States Patent
Murase et al.

(10) Patent No.: US 8,545,324 B2
(45) Date of Patent: Oct. 1, 2013

(54) COMMUNICATION GAME DEVICE

(75) Inventors: Kazue Murase, Tokyo (JP); Akihiro Yokoi, Tokyo (JP)

(73) Assignees: Bandai Co., Ltd., Tokyo (JP); Wiz Co., Ltd., Tokyo (JP)

( * ) Notice: Subject to any disclaimer, the term of this patent is extended or adjusted under 35 U.S.C. 154(b) by 1788 days.

(21) Appl. No.: 11/019,677

(22) Filed: Dec. 23, 2004

(65) Prior Publication Data

US 2005/0148390 A1 Jul. 7, 2005

(30) Foreign Application Priority Data

Dec. 26, 2003 (JP) ................. 2003-435001

(51) Int. Cl.
*A63F 13/00* (2006.01)
(52) U.S. Cl.
USPC ............ 463/40; 463/9; 463/10; 463/42
(58) Field of Classification Search
USPC ............................. 463/42, 9, 10, 40
See application file for complete search history.

(56) References Cited

U.S. PATENT DOCUMENTS

| | | | |
|---|---|---|---|
| 5,491,777 A | 2/1996 | Mase et al. | |
| 5,610,688 A * | 3/1997 | Inamoto et al. | 399/366 |
| 5,966,526 A | 10/1999 | Yokoi | |
| 6,227,966 B1 | 5/2001 | Yokoi | |
| 6,435,969 B1 * | 8/2002 | Tanaka et al. | 463/44 |
| 6,595,860 B1 | 7/2003 | Yamamoto et al. | |
| 6,722,973 B2 | 4/2004 | Akaishi | |
| 7,156,733 B2 * | 1/2007 | Chiang et al. | 463/1 |
| 7,311,608 B1 * | 12/2007 | Danieli et al. | 463/42 |

FOREIGN PATENT DOCUMENTS

| | | |
|---|---|---|
| EP | 0 860 789 A | 8/1998 |
| EP | 1 078 666 A | 2/2001 |
| GB | 2 356 151 A | 5/2001 |
| JP | 10-263212 A | 10/1998 |
| JP | 2000-181875 A | 6/2000 |

OTHER PUBLICATIONS http://en.wikipedia.org/wiki/Pok%C3%A9mon_Gold_and_Silver.*
http://en.wikipedia.org/wiki/Gameplay_of_Pok%C3%A9mon.*

* cited by examiner

*Primary Examiner* — Lawrence Galka
(74) *Attorney, Agent, or Firm* — Smith Patent Office

(57) ABSTRACT

A communication game device which is disclosed can communicate with another game device, memorize the information about a communication partner at the time of the communication, and offer the communication game device which can process information for the succeeding game to be reflected in the contents of a game or the simulation. The communication game device has a processing section, a program storage part which memorizes a control program, an image storage section which memorizes character pictures matched with picture IDs, and controlling elements which can be operated by a game player. When the player's game device receives parameters from another communication game device, the parameters are stored or the data is renewed. If a parameter containing a body ID and the same body ID as arbitrary data is not stored, the arbitrary data in the parameter is memorized. If the parameter has been memorized, it is updated.

6 Claims, 48 Drawing Sheets

| CHARACTER | ITEM | BALANCE IN LEVELS OF MENTAL AND PHYSICAL DEVELOPMENT |
|---|---|---|
| A EARNEST | <br>HARD WORKING AND CHEERFUL | MENTAL: FEW MISTAKES IN MENTAL CARE<br><br>PHYSICAL: FEW MISTAKES IN PHYSICAL CARE |
| B ORDINARY | 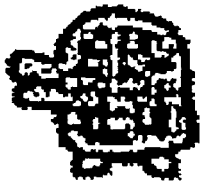<br>ORDINARY, WELL BALANCED CHARACTER | MENTAL: NORMAL<br><br>PHYSICAL: NORMAL |
| C MISCHIEVOUS | <br>ACTIVE AND MISCHIEVOUS | MENTAL: MANY MISTAKES IN MENTAL CARE<br><br>PHYSICAL: ORDINARY LEVEL OF MISTAKES IN PHYSICAL CARE |
| D UNHEALTHY | PHYSICALLY WEAK AND MENTALLY STEADFAST | MENTAL: ORDINARY LEVEL OF MISTAKES IN MENTAL CARE<br><br>PHYSICAL: HIGH LEVEL OF MISTAKES IN PHYSICAL CARE |
| E STUBBORN | TRAUMATIZED IN CHILDHOOD, DISTRUSTFUL AND STUBBORN | MENTAL: MANY MISTAKES IN MENTAL CARE<br><br>PHYSICAL: HIGH LEVEL OF MISTAKES IN PHYSICAL CARE |

FIG. 4

| ITEM | | CONTENT | VARIABLES | DISPLAY |
|---|---|---|---|---|
| HUNGER | CONTENT | HUNGER LEVEL | | UP TO 4 MARKS |
| | CHANGES | ONE MEAL → +1<br>DECREASE ONE AS TIME GOES BY (TIME LENGTH VARIES DEPENDING ON CHARACTER) | 0~6 | |
| | EFFECT | THE NUMBER OF CARE MISTAKES INCREASES IN EVERY 15 MINUTES, IF THE LIVING OBJECT IS LEFT UNCARED AT "0" STATUS. LEVEL OF PHYSICAL UNDERDEVELOPMENT+1 WEIGHT DECREASES EVERY ONE HOUR | | |
| MOOD | CONTENT | MOOD LEVEL | | UP TO 4 MARKS |
| | CHANGES | SNACK, MINIGAME → 1 UP DECREASE BY 1 AS TIME GOES BY. | 0~5 | |
| | EFFECTS | ONE CARE MISTAKE IS COUNTED EVERY 15 MINUTES AT 0 → MENTAL UNDERDEVELOPEMENT | | |
| DISCIPLINE | CONTENT | LEVEL OF DISCIPLINE | | MEMORY IS SHOWN |
| | CHANGES | PATTING → MOOD + 1<br>SCOLDING → MOOD - 1 | 0~9 | |
| AGE | CONTENT | AGE OF TAMAGOCHI | 0~99 | SHOWN IN NUMBERS (AGE) |
| WEIGHT | CONTENT | WEIGHT OF TAMAGOCHI | | SHOWN IN NUMBERS (G) |
| | CHANGES | INCREASE BY GIVING A MEAL AS A SNACK. DECREASE BY PLAYING A MINI-GAME.<br>DECREASES BY 1 GRAM IN EVERY 1 HOUR IF THE HUNGER PARAMETER IS 0 | 5~99 | |
| NAME | CONTENT | THE PLAYER GIVES THE NAME WHEN THE NATURAL LIVING OBJECT WAS BORN, NO CHANGE CAN BE MADE | | SHOWN BY LETTERS |
| MALE/FEMALE | CONTENT | DECIDED ON BIRTH | | MALE OR FEMALE IS SHOWN |
| GENERATION | CONTENT | INDICATE THE GENERATION OF THE CHARACTER AT GROWTH STAGE | 1~99 | SHOWN IN NUMBERS |

FIG. 6

| ITEM | | CONTENTS | VARIABLES |
|---|---|---|---|
| LIST OF PHYSICAL UNDERDEVELOPMENT | CONTENTS | LEVEL OF PHYSICAL UNDERDEVELOPMENT DUE TO MISTAKEN CARE | 0~99 |
| | CHANGES | INCREASE BY COUNTING MISTAKE OF HUNGER PARAMETER<br>INCREASE BY COUNTING MISTAKE OF MEDICAL TREATMENT<br>INCREASE BY MISTAKE IN SCOLDING<br>DECREASE BY PLAYING HURDLE, MORE THAN 20 TIMES → -1 | |
| | EFFECT | CONDITIONS FOR CHANGING A CHARACTER | |
| LIST OF MENTAL UNDERDEVELOPMENT | CONTENTS | LEVEL OF MENTAL UNDERDEVELOPMENT DUE TO MISTAKEN CARE OF TAMAGOTCHI | 0~99 |
| | CHANGES | INCREASE BY COUNTING MISTAKE OF MOOD PARAMETERS<br>INCREASE BY MISTAKE DUE TO PUTTING TO BED<br>INCREASE BY MISTAKE OF PATTING<br>DECREASE BY DANCING MORE THAN 21 → -1 | |
| | EFFECT | CONDITIONS FOR CHANGING TAMAGOTCHI | |
| LEVEL OF GOOD LUCK | CONTENTS | SHOWING HOW GREAT THE GOOD LUCK IS | 1~5 |
| | CHANGES | FIXED FROM THE BIRTH BY THE RELATIONSHIP BETWEEN PARENTS | |
| | EFFECT | LEVEL OF PARTNERS OF ARRANGED DATING<br>LEVEL OF GOOD LUCK OF CHILD | |

FIG. 7

| GROWTH STAGE | MEAL | SNACK | SNACK DISPLAY |
|---|---|---|---|
| BABY | MILK | JUICE | NURSING BOTTLE |
| CHILD | MEAL | CANDY | ENJOYING ROLLING A HARD CANDY IN THE MOUTH |
| TEENAGER | MEAL | CHEWING GUM | BITING |
| ADULT | DEPENDS ON CHARACTER | DEPENDS ON CHARACTER | NO DISPLAY |

FIG. 8A

| CHARACTER | BOILED RICE | SNACK |
|---|---|---|
| MIMITCHI | SUSHI | CAKE |
| MAMETCHI | | |
| KUCHIBUTCHI | BREAD | SOFT CREAM |
| MEMETCHI | | |
| TARAKOTCHI | MEAT | DONUTS |
| ROBOTCHI | FISH | CUSTARD PUDDING |
| HANATCHI | | |
| MASUKUTCHI | MUSHROOM | DUMPLING |
| HOZARUTCHI | | |
| OYAYITCHI | ODEN | SAKE |
| OJITCHI | STEAMED RICE AND BEANS | SAKE |
| OBATCHI | | |

FIG. 8B

| RANK | A | B | C | D | E |
|------|-----|-----|-----|-----|-----|
| A | 50% | 0 | 0 | 0 | 0 |
| B | X | 50% | 0 | 0 | 0 |
| C | X | X | 50% | 0 | 0 |
| D | X | X | X | 50% | 0 |
| E | X | X | X | X | 50% |

FIG. 10

| GIFTS | | CHARACTER'S REACTION | FRIENDSHIP LEVEL | GIVEN PROBABILITY |
|---|---|---|---|---|
| BALL | | PLAY WITH JOY | + 15 UP | 10% |
| CAKE | | EAT WITH JOY | + 10 UP | 15% |
| FLOWERS | | JOY | + 5 UP | 25% |
| FECES | | ANGRY | - 3 DOWN | 25% |
| MONSTER | | SCREAM | - 5 DOWN | 15% |
| SKULL | | GET SICK FROM SHOCK | - 10 DOWN | 10% |

FIG. 11A

| CHARACTERISTICS OF CHARACTER | GIFT | REACTION OF CHARACTER |
|---|---|---|
| EARNEST | NECK TIE, RIBBON | WEAR WITH JOY |
| | PENCIL | WRITE THANK YOU NOTE, STUDY |
| ORDINARY | CAP | WEAR WITH JOY |
| | MARACAS | DANCING FOR JOY |
| MISCHIEVOUS | BOOTS | WEAR WITH JOY |
| | SKATING BOARD | ENJOY SKATEBOARDING |
| WHEALTHY | WIG | WEAR WITH JOY |
| | SOAP BUBBLES | MAKE SOAP BUBBLES |
| STUBBORN | CLOAK | WEAR WITH JOY |
| | WINGS | FLY IN THE AIR |
| | DART | THROW IT |
| OYAJITCHI | HAIR RESTORER | USE IT |

FIG. 11B

| RELATIONSHIP | FRIENDSHIP LEVEL |
|---|---|
| ACQUAINTANCE | 0~19 |
| FRIENDS | 20~59 |
| CLOSE FRIENDS | 60~79 |
| BEST FRIENDS | 80~99 |
| LOVER | 80~89 |
| ARDENT LOVER | 90~99 |

FIG. 11C

| COMBINATIONS OF LEVEL OF GOOD LUCK | LEVEL OF GOOD LUCK |
|---|---|
| 1 X 1, 2 X 2, 2 X 1 | 2 |
| 5 X 1, 4 X 2<br>3 X 3, 3 X 2 | 3 |
| 5 X 3, 5 X 2<br>4 X 3 | 4 |
| 5 X 5, 5 X 4, 4 X 4 | 5 |

SCHEDULE FOR CHILD AND TEENAGER

| | CHILD | TEENAGER a/b | TEENAGER c/d |
|---|---|---|---|
| 7 AM | BEDTIME | BEDTIME | BEDTIME |
| 8 AM | BEDTIME | BEDTIME | BEDTIME |
| 9 AM | YAWN | | |
| 10 AM | | | YAWN |
| 11 AM | | | |
| 12 PM | | | |
| 1 PM | | | |
| 2 PM | PLAY ALONE | PLAY ALONE / PLAY USING ITEM | PLAY ALONE / PLAY USING ITEM |
| 3 PM | PLAY ALONE | PLAY ALONE / PLAY USING ITEM | PLAY ALONE / PLAY USING ITEM |
| 4 PM | | | |
| 5 PM | | | |
| 6 PM | | TAKE A BATH | |
| 7 PM | YAWN | YAWN | TAKE A BATH |
| 8 PM | | | YAWN |
| 9 PM | | | |
| 10 PM | BEDTIME | BEDTIME | BEDTIME |
| 11 PM | | | |
| 12 AM | | | |

FIG. 14

SCHEDULE FOR ADULT

| | A EARNEST | B ORDINARY | C MISCHIEVOUS | D UNHEALTHY | E STUBBORN |
|---|---|---|---|---|---|
| 7 AM | BEDTIME | BEDTIME | BEDTIME | BEDTIME | BEDTIME |
| 8 AM | | | YAWN | | |
| 9 AM | | YAWN | | YAWN | |
| 10 AM | TOOTH BRUSH | | | | YAWN |
| 11 AM | | TOOTH BRUSH | | TOOTH BRUSH | 2ND BEDTIME |
| 12 AM | | | | | |
| 1 PM | PLAY ALONE PLAY USING AN ITEM | | | | |
| 2 PM | | PLAY ALONE PLAY USING AN ITEM | PLAY ALONE PLAY USING AN ITEM | PLAY ALONE PLAY USING AN ITEM | |
| 3 PM | | | | | |
| 4 PM | | | | | PLAY ALONE PLAY USING AN ITEM |
| 5 PM | | | | | |
| 6 PM | BATH TIME | | | | |
| 7 PM | TOOTH BRUSH | BATH TIME | | TOOTH BRUSH | |
| 8 PM | YAWN | TOOTH BRUSH | BATH TIME | YAWN | |
| 9 PM | | YAWN | YAWN | | |
| 10 PM | BEDTIME | BEDTIME | BEDTIME | BEDTIME | YAWN |
| 11 PM | | | | | BEDTIME |
| 12 PM | | | | | |

FIG. 15

|   |   | PLAY ALONE | PLAY USING AN ITEM |
|---|---|---|---|
| C H I L D |  | • VIOLENT MOTION<br>• FALL DOWN | • PLAY WITH A BALL  |
| T E E N A G E R | PHYSICAL MOTION TYPE | • RUN AND FALL<br>• UNUSUAL DANCE | • PLAY WITH A BALL |
| | NON PHYSICAL MOTION TYPE | • RUN AND FALL<br>• SING | • PLAY WITH A BALL |
| A D U L T | EARNEST  | • WALK CLOSE AND LAUGH OR BOW<br>• DANCE  | • STUDY<br>• COME NEAR AND SAY 'THANK YOU'<br>• WEAR A NECKTIE OR RIBBON  |
| | ORDINARY | • COME NEAR WITH A FLOWER IN THE MOUTH<br>• SING  | • DANCING WITH MARACAS<br>• WEAR A CAP  |
| | MISCHIEVOUS | • COME NEAR AND KISS<br>• RUN AND FALL | • SKATE BOARDING<br>• BOOTS |
| | UNHEALTHY | • COME NEAR AND WINK<br>• SING | • PLAY WITH SOAP BUBBLE<br>• WEAR A WIG |
| | MISCHIEVOUS | • PLAY HIDE AND SEEK<br>• WATCH TV  | • JUMP USING WINGS<br>• THROW A DART<br>• WEAR A CLOAK |
| | OYAJITCHI | | • HAIR RESTORER |

FIG. 16

| MONTH | EVENT | DISPLAY |
|---|---|---|
| 1 | 1~3 NEW YEAR DAY  | DISPLAY "HAPPY NEW YEAR"<br>KATO-MATSU<br>KATO-MATSU SHOWN<br>SHI-SHI DANCING<br>- SHI-SHI DANCE WHILE PLAYING ALONE |
| 2 | 3 SETSUBUN | OGRE OR GOD OF WEALTH APPEARS<br>- SURPRISE BY OGRE OR JOY BY FORTUNE |
| | 14 ST. VALENTINE'S DAY | MALE CHARACTER GETS CHOCOLATE ACCORDING TO THE PROBABILITY IN PLAY ALONE MODE |
| 3 | 1~3 DOLL'S FESTIVAL  | PAPER LANTERN DISPLAY<br>TURNED ON AT WAKE UP TIME.⟶TURNED OFF ON NEXT OPERATION |
| | 14 WHITE DAY | FEMALE CHARACTER MAY BE GIVEN COOKIES BY A PROBABILITY |
| 4 | 1 APRIL FOOLS DAY | PRETENDING TO BE DEAD WHILE PLAYING ALONE |
| | 3~10 CHERRY BLOSSOM | PLAYING ALONE MODE - CHERRY BLOSSOM WATCHING |
| 5 | 1~5 CHILDREN'S FESTIVAL  | CARP STREAMER<br>CARP STREAMER DISPLAYED, AND DISAPPEARS ON NEXT OPERATION |
| 6 | 15~30 RAINING SEASON | DISPLAY OF THE PAPER DOLL AS A CHARM,<br>DISAPPEARS ON NEXT OPERATION |
| 7 | 7~10 STAR FESTIVAL  | MILKY WAY<br>THE MILKY WAY APPEARS WHILE PLAYING ALONE |
| 8 | 15 BON FESTIVAL | GHOST COMES OUT |
| | 20 SUMMER FESTIVAL  | FIREWORKS GOING UP AFTER 17:00 IN PLAYING ALONE MODE<br>PORTABLE SHRINE APPEAR |
| 9 | 17~19 FULL MOON FESTIVAL | FULL-MOON WATCHING AFTER 17:00 AT PLAYING ALONE MODE |
| 10 | 10 HEALTH SPORT DAY | SCHOOL SPORTS, JUMPING HURDLES AT SCHOOL |
| | 31 HALLOWEEN | PUMPKIN MONSTER APPEARS IN PLAYING ALONE MODE |
| 11 | 15 SHICHI-GO-SAN | GIFT FOR 3, 5, 7 YEAR OLD TAMAGOTCHI |
| 12 | 24 CHRISTMAS | 20-25 CHRISTMAS TREE AT WAKE UP TIME<br>24-MIDNIGHT SANTA CLAUS BRINGING PRESENTS |
| | 31 NEW YEAR'S EVE | COUNT DOWN 5 SEC. BEFORE NEW YEAR'S DAY<br>HAPPY NEW YEAR EVENTS |

FIG. 17

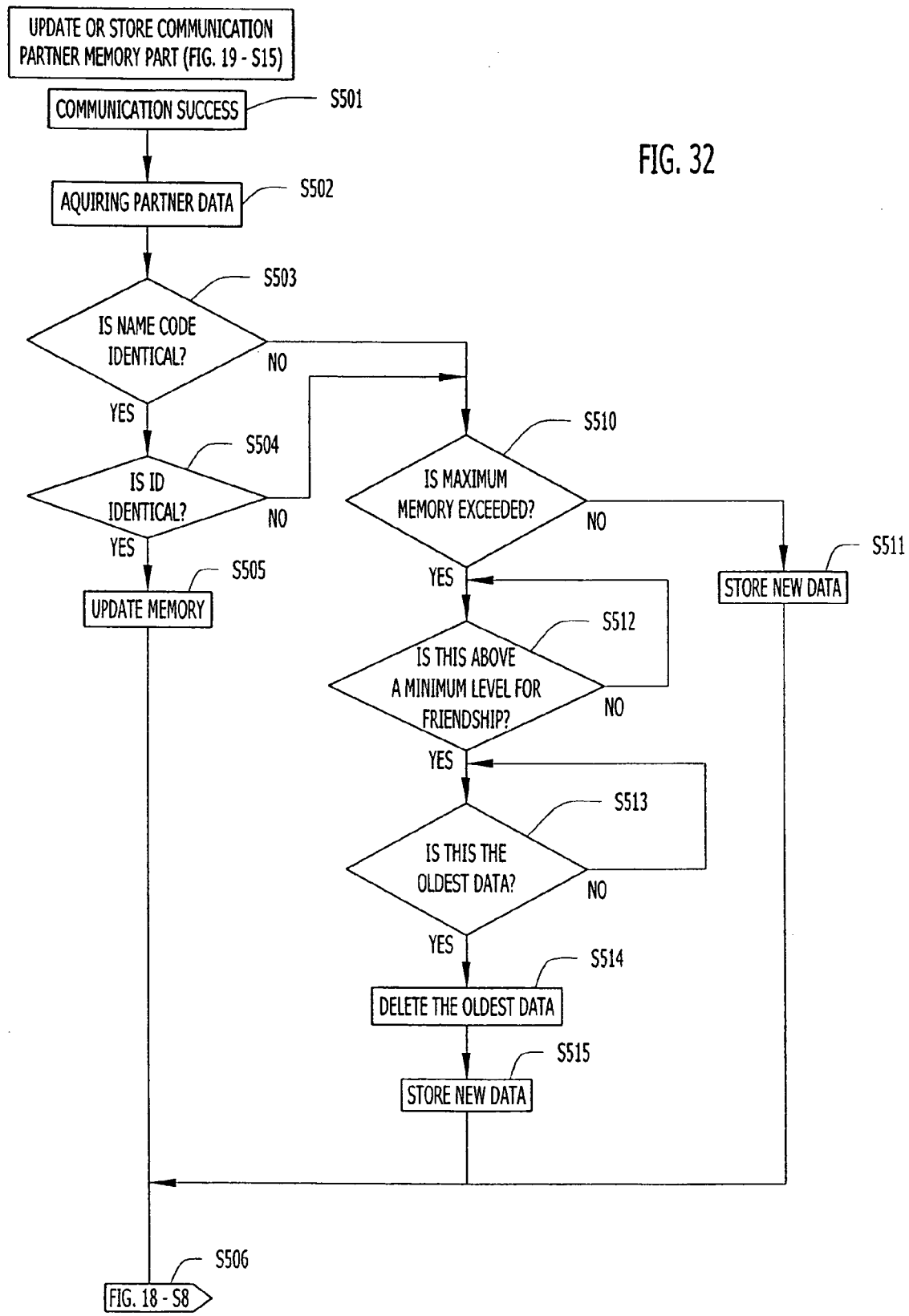

| VER 0 | REPRODUCED TAMAGOTCHI | |
|---|---|---|
| VER 1 | STORE | |
| VER 2 | TAMAGOTCHI NEO | |
| VER 3 | PORTABLE TAMAGOTCHI | |
| VER 4 | TAMAGOTCHI PRODUCT A | |
| VER 5 | TAMAGOTCHI PRODUCT B | |
| VER 6 | TAMAGOTCHI PRODUCT C | |
| VER 7 | TAMAGOTCHI PRODUCT D | |
| VER 8 | TAMAGOTCHI PRODUCT E | |
| VER 9 | TAMAGOTCHI PRODUCT F | |
| VER 10 | TAMAGOTCHI PRODUCT G | |
| VER 11 | TAMAGOTCHI PRODUCT H | |
| VER 12 | TAMAGOTCHI PRODUCT I | |
| VER 13 | TAMAGOTCHI PRODUCT J | |
| VER 14 | TAMAGOTCHI PRODUCT K | |
| VER 15 | TAMAGOTCHI PRODUCT L | |

FIG. 33

| NO. | CONTENT |
|---|---|
| 00 | TAMAGO |
| 01 | BEBITCHI |
| 02 | SHIROBEBITCHI |
| 03 | MARUTCHI |
| 04 | KINAKOMOTCHI |
| 05 | ICHIGOTCHI |
| 06 | HINOTAMATCHI |
| 07 | YANGUMIMITCHI |
| 08 | ONITCHI |
| 09 | MAMETCHI |
| 0A | KUTCHIBATCHI |
| 0B | TARAKOTCHI (A) |
| 0C | HANATCHI |
| 0D | MASUKUTCHI |
| 0E | MIMITCHI |
| 0F | MEMETCHI |
| 10 | TARAKOTCHI (B) |
| 11 | ROBOTCHI |
| 12 | GOZARUTCHI |
| 13 | OYAJITCHI |
| 14 | OJITCHI |
| 15 | OTOKITCHI |
| 16 | NAZO |
| 17 | OMURANTCHI |
| 18 | KABUSERUTCHI |
| 19 | TAMAGOTCHI |
| 1A | TUTATCHI |
| 1B | BAGATCHI |
| 1C | DENPATCHI |
| 1D | MAIKUTCHI |
| 1E | RESERVED |
| 1F | RESERVED |

FIG. 34

| ADDRESS | NAME | 0 | 1 | 2 | 3 | 4 | 5 | 6 | 7 |
|---|---|---|---|---|---|---|---|---|---|
| 000 | NAME | ID | DATE OF BIRTH(DAY) | DATE OF BIRTH(MONTH) | NAME 1 | NAME 2 | NAME 3 | NAME 4 | NAME 5 |
| | 0 | | | | | | | | |
| | 1 | | | | | | | | |
| | 2 | | | | | | | | |
| | 3 | | | | | | | | |
| | 4 | | | | | | | | |
| | 5 | | | | | | | | |
| | 6 | | | | | | | | |
| | 7 | | | | | | | | |
| 010 | NAME | CURRENT MINUTES | CURRENT HOUR | PARAMETER 1 | PARAMETER 2 | PARAMETER 3 | PARAMETER 4 | INFORMATION 2 | INFORMATION 3 |
| | 0 | | | DISCIPLINE | GOOD MOOD | CARE MISTAKE | MENTAL UNDERDEVELOPMENT | ILLNESS | |
| | 1 | | | | | | | SERIOUS ILLNESS | |
| | 2 | | | | | | | SLEEP | |
| | 3 | | | SNACKS | HUNGER | | | DEATH | |
| | 4 | | | | | PHYSICAL UNDERDEVELOPMENT | LEVEL OF GOOD LUCK | DAYS OF RAISING KIDS | NUMBER OF DAYS OF BREEDING |
| | 5 | | | | | | | | |
| | 6 | | | | | | | | REBELLIOUS AGE CHANGES |
| | 7 | | | | | | | | |

FIG. 35A

| ADDRESS | NAME | 8 | 9 | A | B | C | D | E | F |
|---|---|---|---|---|---|---|---|---|---|
| | | PRESENT DATE | PRESENT MONTH | CHARACTER # | AGE | GENERATION | WEIGHT | INFORMATION 1 | TIME FOR ONE GENERATION |
| 000 | 0 | | | | | | | | |
| | 1 | | | | | | | FEMALE | |
| | 2 | | | | | | | OBESE | |
| | 3 | | | | | | | FEMALE BABY | |
| | 4 | | AFTER 2ND GENERATION | | | | | RAISING KIDS | |
| | 5 | | REMAINING DAYS | | | | | | |
| | 6 | | DAY CHARACTER | | | | | | |
| | 7 | | CHANGING OYAJI CHARACTER | | | | | | |
| 010 | 0 | | | | | | | | |
| | 1 | | | | | | | | |
| | 2 | | | | | | | | |
| | 3 | | | | | | | | |
| | 4 | | | | | | | | |
| | 5 | | | | | | | | |
| | 6 | | | | | | | | |
| | 7 | | | | | | | | |

FIG. 35B

| ADDRESS | 0 | 1 | 2 | 3 | 4 | 5 | 6 | 7 |
|---|---|---|---|---|---|---|---|---|
| NAME | ITEM 1 | ITEM 2 | | | | | | |
| 0 | BALL | CLOAK | | | | | | |
| 1 | PENCIL | RIBBON | | | | | | |
| 2 | WIG | DART | | | | | | |
| 3 | SUNGLASSES | BOOTS | | | | | | |
| 4 | SOAP BUBBLE | CAP | | | | | | |
| 5 | SKATEBOARDING | NECKTIE | | | | | | |
| 6 | DUMBELL | WING | | | | | | |
| 7 | MARACAS | HAIR RESTORER | | | | | | |
| NAME | | | | | | | | |
| 0 | | | | | | | | |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |

| ADDRESS | 8 | 9 | A | B | C | D | E | F |
|---|---|---|---|---|---|---|---|---|
| 020 NAME | | | | | | | | |
| 0 | | | | | | | | |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 030 NAME | | | | | | | | |
| 0 | | | | | | | | |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |

FIG. 35D

| BYTE | BIT | | | |
|---|---|---|---|---|
| 1 | 0 | 0 | RECOGNITION CODE | (00) |
| | 1 | 0 | | |
| | 2 | 1 | | |
| | 3 | 1 | | |
| | 4 | 0 | VERSION | VER. BIT 0 (01) |
| | 5 | 0 | | VER. BIT 1 |
| | 6 | 0 | | VER. BIT 2 |
| | 7 | 0 | | VER. BIT 3 |
| 2 | 0 | | COMMAND | (02) |
| | 1 | | | |
| | 2 | | | |
| | 3 | | | |
| | 4 | | | (03) |
| | 5 | | | |
| | 6 | | | |
| | 7 | | | |
| 3 | 0 | | ID | ID BIT0 (04) |
| | 1 | | | ID BIT1 |
| | 2 | | | ID BIT2 |
| | 3 | | | ID BIT3 |
| | 4 | | | ID BIT4 (05) |
| | 5 | | | ID BIT5 |
| | 6 | | VERSION | VER. BIT4 |
| | 7 | | | VER. BIT5 |
| 4 | 0 | | CHARACTER NO. | (06) |
| | 1 | | | |
| | 2 | | | |
| | 3 | | | |
| | 4 | | | (07) |
| | 5 | | | |
| | 6 | | SEX | 0 = MALE  1 = FEMALE |
| | 7 | | NO MYSTERY | MYSTERY = 0  NO MYSTERY = 1 |
| 5 | 0 | | NAME 1 | (08) |
| | 1 | | | |
| | 2 | | | |
| | 3 | | | |
| | 4 | | | (09) |
| | 5 | | | |
| | 6 | | | |
| | 7 | | | |

FIG. 36A

| BYTE | BIT | | | |
|---|---|---|---|---|
| 6 | 0 | | NAME 2 | (0A) |
|  | 1 | | | |
|  | 2 | | | |
|  | 3 | | | |
|  | 4 | | | (0B) |
|  | 5 | | | |
|  | 6 | | | |
|  | 7 | | | |
| 7 | 0 | | NAME 3 | (0C) |
|  | 1 | | | |
|  | 2 | | | |
|  | 3 | | | |
|  | 4 | | | (0D) |
|  | 5 | | | |
|  | 6 | | | |
|  | 7 | | | |
| 8 | 0 | | NAME 4 | (0E) |
|  | 1 | | | |
|  | 2 | | | |
|  | 3 | | | |
|  | 4 | | | (0F) |
|  | 5 | | | |
|  | 6 | | | |
|  | 7 | | | |
| 9 | 0 | | NAME 5 | (10) |
|  | 1 | | | |
|  | 2 | | | |
|  | 3 | | | |
|  | 4 | | | (11) |
|  | 5 | | | |
|  | 6 | | | |
|  | 7 | | | |
| 10 | 0 | | AGE | (12) |
|  | 1 | | | |
|  | 2 | | | |
|  | 3 | | | |
|  | 4 | | | (13) |
|  | 5 | | | |
|  | 6 | | | |
|  | 7 | | | |

FIG. 36B

| BYTE | BIT | | | |
|---|---|---|---|---|
| 11 | 0 | | LEVEL OF GOOD LUCK | (14) |
| | 1 | | | |
| | 2 | | | |
| | 3 | | | |
| | 4 | | HUNGER PARAMETER | (15) |
| | 5 | | | |
| | 6 | | | |
| | 7 | | | |
| 12 | 0 | | BASIC RANK | (16) |
| | 1 | | | |
| | 2 | | | |
| | 3 | | | |
| | 4 | | OBESE | (17) |
| | 5 | | ILLNESS | |
| | 6 | | RAISING KIDS | |
| | 7 | | | |
| 13 | 0 | | FRIENDSHIP LEVEL | (18) |
| | 1 | | | |
| | 2 | | | |
| | 3 | | | |
| | 4 | | | (19) |
| | 5 | | | |
| | 6 | | | |
| | 7 | | | |
| 14 | 0 | | NUMBER OF CONTACT | (1A) |
| | 1 | | | |
| | 2 | | | |
| | 3 | | | |
| | 4 | | | (1B) |
| | 5 | | | |
| | 6 | | | |
| | 7 | | | |
| 15 | 0 | | CHARACTER CLASSIFICATION | (1C) |
| | 1 | | | A,B,C,D,E CHARACTER CLASSIFICATION |
| | 2 | | | |
| | 3 | | | |
| | 4 | | GROWTH MADE | (1D) |
| | 5 | | | |
| | 6 | | | |
| | 7 | | | |

FIG. 36C

| BYTE | BIT | | | |
|---|---|---|---|---|
| 16 | 0 | | BREEDING DAY | (1E) |
| | 1 | | | |
| | 2 | | | |
| | 3 | | | |
| | 4 | | | (1F) |
| | 5 | | | |
| | 6 | | | |
| | 7 | | | |
| 17 | 0 | | | (20) |
| | 1 | | | |
| | 2 | | | |
| | 3 | | | |
| | 4 | | | (21) |
| | 5 | | | |
| | 6 | | | |
| | 7 | | | |
| 18 | 0 | | PARITY | (22) |
| | 1 | | | |
| | 2 | | | |
| | 3 | | | |
| | 4 | | | (23) |
| | 5 | | | |
| | 6 | | | |
| | 7 | | | |

FIG. 36D

| ADDRESS | 0 | 1 | 2 | 3 | 4 | 5 | 6 | 7 |
|---|---|---|---|---|---|---|---|---|
| NAME | ID | CHARACTER NUMBER | VER | NAME 1 | NAME 2 | NAME 3 | NAME 4 | NAME 5 |
| 0 | | | VER. A | | | | | |
| 1 | | | | | | | | |
| 2 | | | | | | | | |
| 3 | | | | | | | | |
| 4 | | | RELATIONSHIP | | | | | |
| 5 | | SEX | | | | | | |
| 6 | VER. B | | | | | | | |
| 7 | | NO MYSTERY | | | | | | |
| NAME | ID | CHARACTER NUMBER | VER | NAME 1 | NAME 2 | NAME 3 | NAME 4 | NAME 5 |
| 0 | | | VER. A | | | | | |
| 1 | | | | | | | | |
| 2 | | | | | | | | |
| 3 | | | | | | | | |
| 4 | | | RELATIONSHIP | | | | | |
| 5 | | SEX | | | | | | |
| 6 | | | | | | | | |
| 7 | | NO MYSTERY | | | | | | |

| ADDRESS | NAME | 8 FRIENDSHIP LEVEL | 9 NUMBER OF CONTACT | A | B | C | D | E | F |
|---|---|---|---|---|---|---|---|---|---|
| 040(1) | 0 | | | | | | | | |
| | 1 | | | | | | | | |
| | 2 | | | | | | | | |
| | 3 | | | | | | | | |
| | 4 | | | | | | | | |
| | 5 | | | | | | | | |
| | 6 | | | | | | | | |
| | 7 | | | | | | | | |
| 050(2) | NAME | FRIENDSHIP LEVEL | NUMBER OF CONTACT | | | | | | |
| | 0 | | | | | | | | |
| | 1 | | | | | | | | |
| | 2 | | | | | | | | |
| | 3 | | | | | | | | |
| | 4 | | | | | | | | |
| | 5 | | | | | | | | |
| | 6 | | | | | | | | |
| | 7 | | | | | | | | |

FIG. 37B

| ADDRESS | 0 | 1 | 2 | 3 | 4 | 5 | 6 | 7 |
|---|---|---|---|---|---|---|---|---|
| NAME | ID | CHARACTER NUMBER | VER | NAME 1 | NAME 2 | NAME 3 | NAME 4 | NAME 5 |
| 0 | | | | | | | | |
| 1 | | | VER. A | | | | | |
| 2 | | | | | | | | |
| 3 | | | RELATIONSHIP | | | | | |
| 4 | | | | | | | | |
| 5 | | SEX | | | | | | |
| 6 | VER. B | | | | | | | |
| 7 | | NO MYSTERY | | | | | | |

060(3)

| NAME | 0 | 1 | 2 | 3 | 4 | 5 | 6 | 7 |
|---|---|---|---|---|---|---|---|---|
| | ID | CHARACTER NUMBER | VER | NAME 1 | NAME 2 | NAME 3 | NAME 4 | NAME 5 |
| 0 | | | | | | | | |
| 1 | | | VER. A | | | | | |
| 2 | | | | | | | | |
| 3 | | | RELATIONSHIP | | | | | |
| 4 | | | | | | | | |
| 5 | | SEX | | | | | | |
| 6 | VER. B | | | | | | | |
| 7 | | NO MYSTERY | | | | | | |

| ADDRESS | | A | B | C | D | E | F |
|---|---|---|---|---|---|---|---|
| | 8 | 9 | | | | | |
| NAME | FRIENDSHIP LEVEL | NUMBER OF CONTACT | | | | | |
| 0 | | | | | | | |
| 1 | | | | | | | |
| 2 | | | | | | | |
| 3 | | | | | | | |
| 4 | | | | | | | |
| 5 | | | | | | | |
| 6 | | | | | | | |
| 7 | | | | | | | |
| NAME | FRIENDSHIP LEVEL | NUMBER OF CONTACT | | | | | |
| 0 | | | | | | | |
| 1 | | | | | | | |
| 2 | | | | | | | |
| 3 | | | | | | | |
| 4 | | | | | | | |
| 5 | | | | | | | |
| 6 | | | | | | | |
| 7 | | | | | | | |

COMMUNICATION GAME DEVICE

BACKGROUND OF THE INVENTION

1. Field of the Invention

The present invention relates to a communication game device. More specifically, the present invention relates to a game device used by one person which can memorize information on another game device as a game partner communicated with and used by another.

2. Discussion of the Related Art

Japanese Patent Publication No. 10-263212 discloses a "connect-to-partner" type liquid crystal game device and a "connect-to-partner" type liquid crystal game method. This game device communicates with a partner device. This publication discloses techniques related to a device for playing a game where a game character displayed on a liquid crystal display is able to grow as the game character while having virtual experiences in the game and a game where another character in another game device is in communication with the game device where the other character is also able to grow in a similar manner.

The above-mentioned liquid crystal game device allows a player to compete with another player on a game device communicating with the player. However, the above-mentioned conventional liquid crystal game device cannot memorize the information about the partner device so as to reflect this information in a game played later on the game device.

SUMMARY OF THE INVENTION

The present invention has been proposed in view of the above-mentioned related art. An object of the present invention is to provide a communication game device capable of playing various games with another partner device that is in communication with the player's game device. The communication game device is capable of performing simulations and memorizing information about the character of the partner device and reflecting the information in games which will be played at a later time.

Another object of the invention is to provide a communication game device capable of displaying a character of the partner's device on the player's display without transferring a large amount of image data.

Still another object of the invention is to provide a communication game device which is capable of performing a communication game, a simulation, etc. even in the case where the players use a different versions of the game devices and therefore one of the game devices does not have the image data about the character of the partner device by showing an alternative picture as the character of the partner device on the display picture of the game device.

BRIEF DESCRIPTION OF THE DRAWINGS

FIG. 4 is a table showing the kinds of virtual living objects for which an image display is carried out in the communication game device of the present invention.

FIG. 6 is a table of parameters to be checked with the virtual living object in the communication game device of the present invention.

FIG. 7 is a table of hidden parameters of the virtual living object in the communication game device of the present invention.

FIGS. 8A and 8B are tables of the "meals" and "snacks" which can be given to the virtual living object in the communication game device of the present invention.

FIG. 10 is a table showing the victory-or-defeat conditions at the time a game is played by the virtual living object in the communication game device of the present invention.

FIGS. 11A, 11B and 11C are tables showing the gifts which the virtual living object can acquire and the friendship level used in the communication game device of the present invention.

FIG. 14 is a table showing a schedule for a day of the virtual living object during childhood and the teenager years in the communication game device of the present invention.

FIG. 15 shows a schedule for a day of the virtual living object as an adult in the communication game device of the present invention.

FIG. 16 is a table explaining the image display showing "playing alone" and "play with an item" of the virtual living object in the communication game device of the present invention.

FIG. 17 is a table of examples of the image displays for various seasons in the communication game device of the present invention.

FIG. 32 is a flow chart of the "friend list registration and updating" processing steps of a communication game device of the present invention.

FIG. 33 is a table showing a list of "recognition codes" in the communication game device of the present invention.

FIG. 34 is a table showing the correspondence between the character picture and the character number (picture ID) in the communication game device of the present invention.

FIGS. 35A, 35B, 35C and 35D are portions of a spreadsheet showing the parameters stored in the parameter memory part provided in an EEPROM in the communication game device of the present invention.

FIGS. 36A, 36B, 36C and 36D are portions of a correspondence table showing the initial communication data in the communication game device of the present invention.

FIGS. 37A, 37B, 37C and 37D are portions of a spreadsheet of the partner communication memory part provided in the EEPROM in the communication game device of the present invention.

DETAILED DESCRIPTION OF THE PREFERRED EMBODIMENTS

Figure 1:
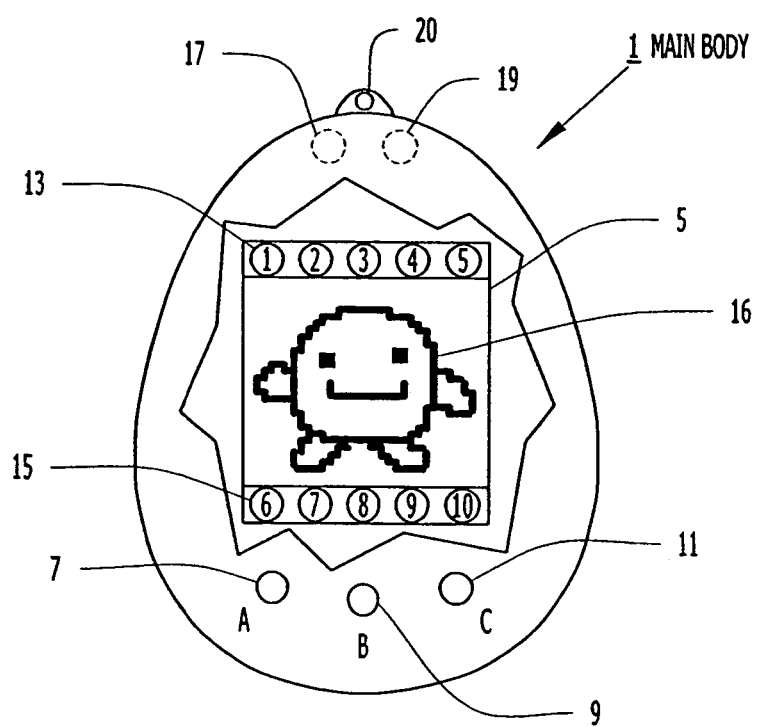
FIG. 1 is an elevational view showing an appearance of a communication game device of the present invention.

In view of the above-mentioned subject, the present invention according to claim 1 has the elements described below. Namely, the communication game device comprises:
- a data processing section,
- a program storage part which memorizes control programs for controlling the communication game device by the data processing section,
- an image storage section which memorizes a picture ID and a character picture matched with the picture ID,
- a controlling element which can be operated by a game player,
- a parameter storage section for storing a parameter including the picture ID, a device ID given by the data processing section to the communication game device based on the control programs, and arbitrary data given by the game player by means of the controlling element,
- a displaying element for displaying the character picture, the character picture being obtained by the data processing section from the image storage section and corresponding to the picture ID stored in the parameter storage section,
- a transmitting section capable of transmitting the parameters stored in the parameter storage section to another communication game device,
- a receiving section capable of receiving a parameter transmitted by another communication game device,
- a communication partner memory section for storing the parameter according to a device ID and name received by the receiving section,
- wherein the data processing section is capable of:
    - performing a control based on the control programs stored in the program storage section for displaying a list of parameters stored in the communication partner memory section,
    - determining, every time the receiving section receives a parameter transmitted by another communication game device, whether the parameter has been stored in the communication partner memory section,
    - renewing the parameter stored in the parameter storage section if the data processing section determines that the parameter transmitted by another communication game device has been stored in the partner communication memory section, and
    - adding new information if the data processing section determines that the parameter transmitted by another communication game device has not been stored in the partner communication memory section.

The invention according to claim 2 has the elements expressed below. Namely, the communication game device according to claim 1, wherein the image storage section further comprises a code memory section for storing the player's memory picture code which is determined according to a type of the character picture and the relationship between the picture ID and the character ID,
- wherein the transmitting section is further capable of transmitting a player's memory picture code stored in the code memory section along with the parameters stored in the parameter store section to another communication game device,
- wherein the receiving section is further capable of receiving the partner's memory picture code transmitted by the partner communication game device,
- wherein the image storage section further comprises another section for storing a memory code mismatch image,
- wherein the data processing section is further capable of:
    - comparing the player's memory picture code stored in the code memory section and the partner memory picture code received by the receiving section,
    - obtaining a character picture which corresponds to the ID received by the receiving section from the image storage section to display a picture of the virtual living object of the partner communication game device if the partner memory picture code is identified by the player's memory picture code stored in the code memory section, and
    - obtaining the memory code mismatch image from the image storage section to display as the partner's virtual living object on the displaying element if the partner memory picture code is not identified with the player's memory picture code stored in the code memory section.

The communication game device of the present invention memorizes parameters including a body ID given to the game device and arbitrary data (such as the name of the virtual living object, etc.) given by the game player. The communication game device of the present invention transmits and receives the parameters of other communication game devices according to the control program memorized in the partner's communication memory part. When the communication game device receives parameters from another device, the communication game device refers to the parameter memorized in the partner's communication memory part to confirm that the parameters including the body ID and the arbitrary data received from the partner are the parameters stored in the partner communication memory part. When it is determined that the parameters including the body ID and the arbitrary data received from the partner are the same as the data stored in the partner's communication memory part, the received data is updated. When it is determined that the parameters including the body ID and the name data parameter received from the partner are not stored in the partner's communication memory part, the received parameters are stored in the partner's communication memory part. Thus by using both the body ID and the character name from the game partner to identify the partner's communication data, data updating errors can be prevented.

The communication game device of the present invention has a memory picture code storage part which memorizes the "memory picture code" determined according to a match with the kind of character picture or the character picture and the picture ID. An image storage section stores pictures which are to be shown on the display as the virtual living object of a communication game device when the "memory picture code" which is sent from other communication game devices differs from the "memory picture code" of a player's game device. Even in a case where an old communication game device is used which is capable of communicating with a new game device and yet which has stored different characters from the characters stored in the new game device, communication can be established without any problems.

Hereinafter, embodiments of the present invention will be explained with reference to the drawings.

FIG. 1 is an outline view of the communication game device of the present invention, in which 1 represents the main body of the communication game device (hereinafter called the "main body"). The display element (liquid crystal) 5 which constitutes a liquid crystal display is formed on the front center of the main body 1. Below the display element 5, three switches (an A button 7, a B button 9 and a C button 11) are provided as the controlling elements. The A button 7 is a switch which selects a command performed by the program. The B button 9 is a switch with which the decision of a command is made. The C button 11 is a switch which cancels the selected command.

Two or more symbols 13 and 15 are displayed on the upper and lower portions of the display element 5 by executing a program which will be described later. A character picture 16 which shows a virtual living object is displayed in the center of the display. The main body 1 has an infrared light emitting device 17 at the upper part which is a sender and an infrared light receiving device 19 which is a receiver and they enable communication with other communication game devices. A small through hole 20 is provided to receive a chain for hanging the device.

Figure 2:
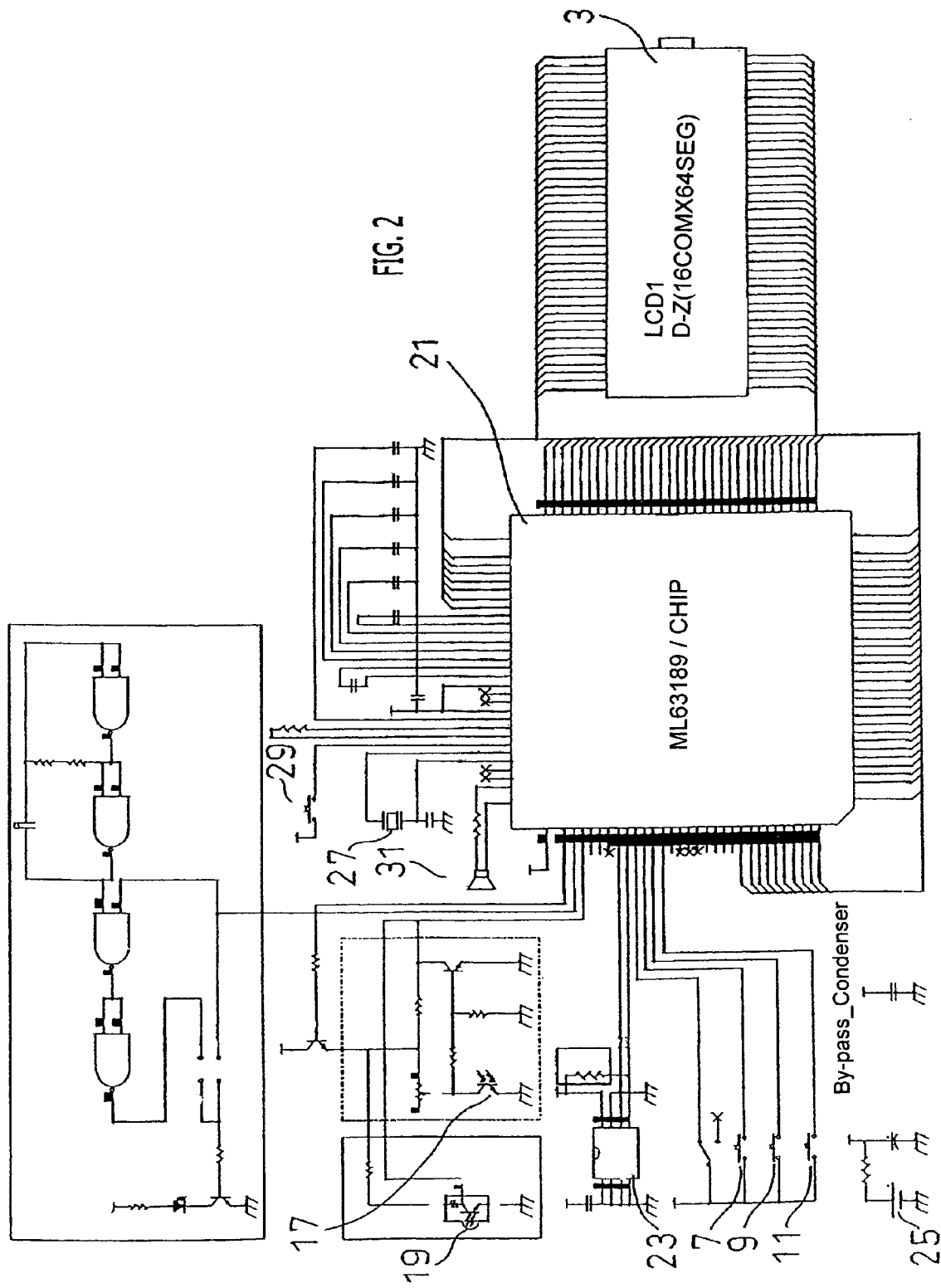
FIG. 2 is the circuit diagram of the communication game device of the present invention.

FIG. 2 shows the circuit diagram of the communication game device of the present invention. A one chip type microcomputer 21 having a CPU (central processing unit) function i.e., control of each means to be mentioned later and a driver function, i.e., control of the liquid crystal display 3 and the various devices. The microcomputer 21 is connected to the liquid crystal display 3, the A button 7, the B button 9, the C button 11, the infrared luminescent device 17, and the light receiving device 19. The microcomputer 21 is also connected to an EEPROM 23, a battery 25, a clock signal generating means 27, a reset switch 29, and a buzzer 31. These devices are controlled based on the program mentioned later.

Inside the microcomputer 21, a program storage part which memorizes programs (control program) enabling the game device to operate as a communication game device, and the image storage section which memorizes the picture ID (ID: identification information) are provided. Also, the character picture 16 is corrected with the picture ID.

Various kinds of information acquired during execution of the program are stored in the EEPROM 23 as a parameter memory part and a partner's communication memory part.

Figure 3:
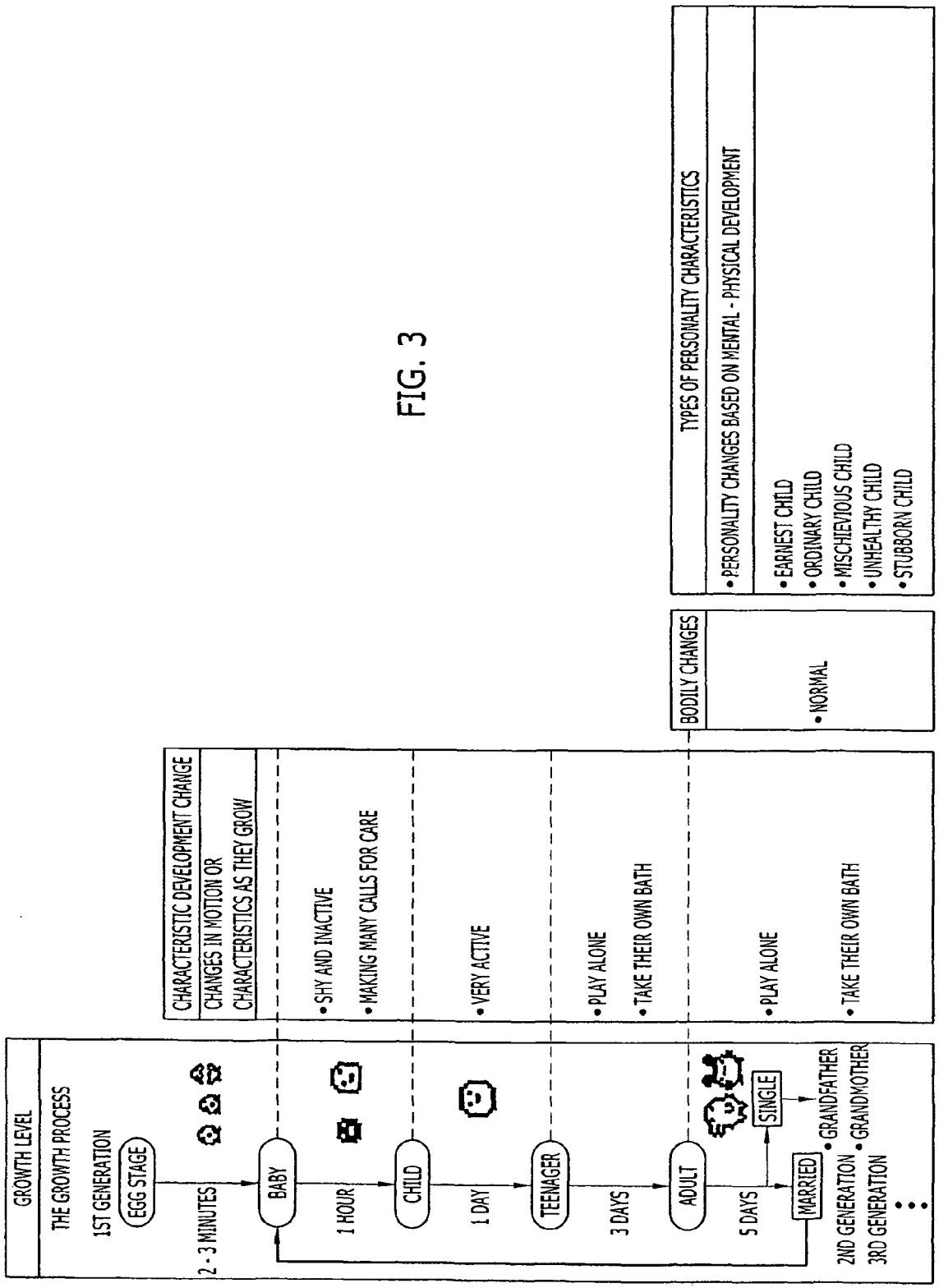
FIG. 3 is a diagram explaining the growth process of the virtual living object for which an image display is carried out in the communication game device of the present invention.

FIG. 3 is a diagram explaining the growth process of an imaginary living object (hereinafter called a "virtual living object") displayed as the character picture 16. The virtual living object has several modes of growth stages including an egg period, infancy, childhood, teenager, and an adult. An egg period is the mode in which an egg of the virtual living object is displayed, or when a power supply is switched on for the first time or a reset switch is turned on. The mode then shifts to the next stage, i.e. infancy, after an animated presentation for 2 to 3 minutes of an egg being hatched.

After one hour of infancy, the virtual living object passes into childhood. After one day of childhood, the virtual living object grows into a teenager. The teenager grows into an adult after three days. There is not another growth stage after becoming an adult of breeding age, however an image may be displayed showing the virtual living object laying new eggs of a next-generation according to various communications or operations. Also, when a required operation is not performed or the virtual living object is neglected, a picture is presented on the display showing that the virtual living object has died.

FIG. 4 is a table showing various kinds of virtual living objects displayed as an adult according to the growth process in each mode of infancy, childhood, and the teenage years. Each virtual living object is classified by a "mental parameter" and a "physical parameter" into five ranks, A (earnest), B (ordinary), C (mischievous), D (unhealthy), and E (stubborn). The picture of the virtual living object displayed for every rank is prescribed by the picture ID.

FIG. 34 is a concordance showing the name of each character picture 16 memorized by the image storage section, and the character number used as the picture ID. For example, the character number "01" is memorized in the parameter memory part for the character picture of "bebitchi" (baby), or "02" for "shirobebitchi" (white baby) to be displayed as the virtual living object on the player's game device. The character number "16" is defined as a "mystery" character. This indicates that a "memory code mismatch image" be shown when the memory picture code of the game player is different from that of a communication partner.

As described above, the program performed by the microcomputer 21 according to operations of the A button 7, the B button 9, and the C button 11 and according to communications with other devices is stored in the microcomputer 21.

Figure 5:
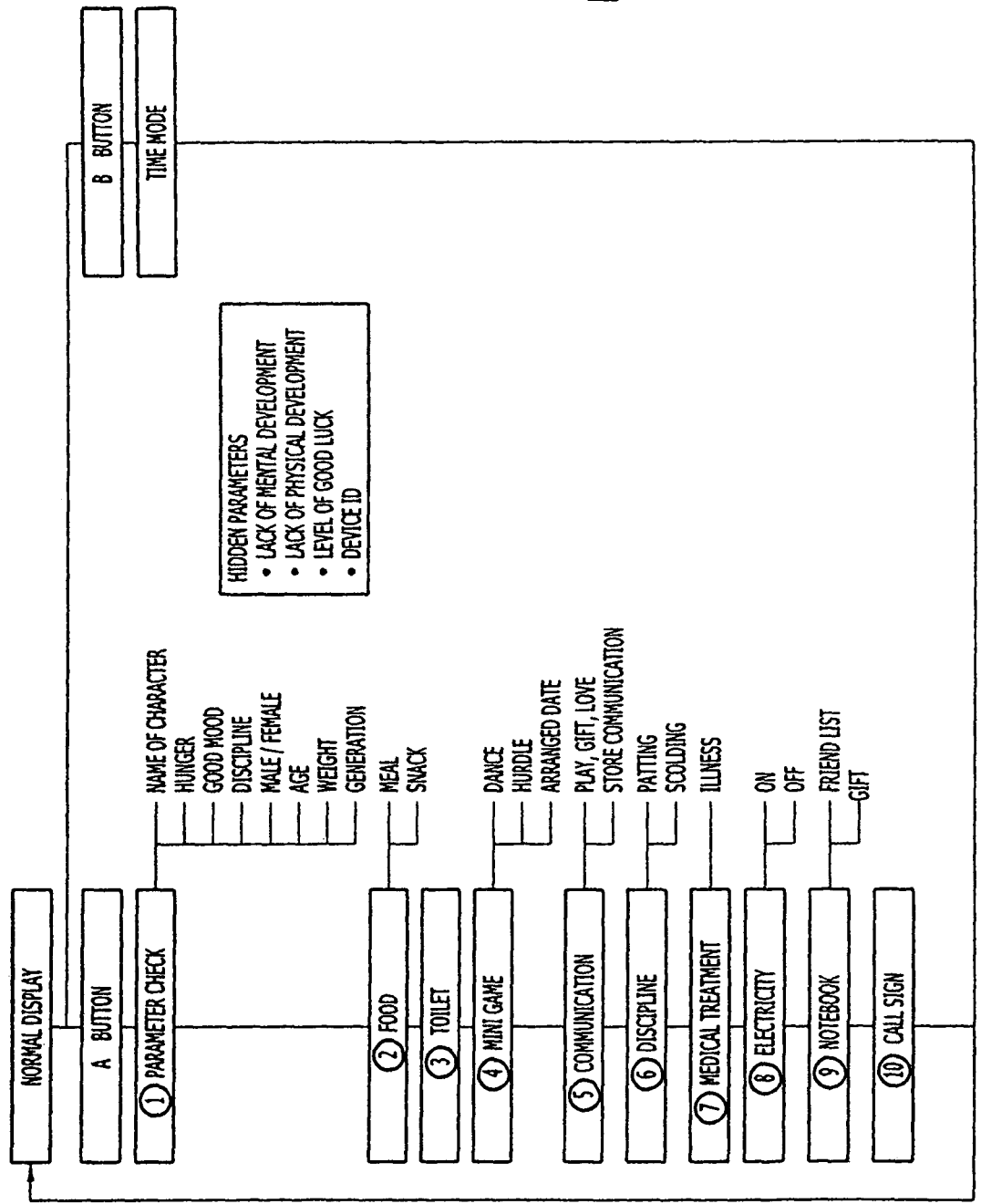
FIG. 5 is a schematic diagram showing an outline of the program steps performed by the microcomputer in the communication game device of the present invention.

FIG. 5 is a schematic diagram showing the outline of the program manipulation performed by a microcomputer 21. Usually, the picture of the virtual living object according to the rank of the character is displayed on the display element 5. Five commands represented by (1)-(5) in FIG. 5 are each displayed as the icons 13 on the upper portion of the display element 5. Also, five commands represented by (6)-(10) in FIG. 5 are each displayed as the icons 15 on the lower portion of the display element 5. As is shown in FIG. 5, each icon has a name: icon (1) "parameter check"; icon (2) "food"; icon (3) "toilet"; icon (4) "mini-game"; icon (5) "communication"; icon (6) "discipline"; icon (7) "medical treatment"; icon (8) "electricity"; icon (9) "notebook"; and icon (10) "call sign".

These icons, also called "command icons", are selected by first highlighting the number e.g., (1) by pushing the button A and then by pushing the button B to select the "parameter check" command. If the C button 11 is pushed, the highlighted number will be canceled and the display returns to the normal picture. If the A button 7 is continuously pushed after number (1) is highlighted, the next icon (2) "food" will be displayed. Then every time the A button 7 is pushed, icons (3), (4), (5) - - - (9) and (10) are sequentially displayed.

Icon (1) "parameter check" is a command for displaying on the display the contents of the various parameters set for the character, which is the virtual living object, so the player can check them. Upon selecting the "parameter check" icon, the player can check the various parameters given as the player's choice to describe the state of the virtual living object such as the "name", "hunger", "mood", "discipline", "male or female", "age", "weight", and "generation". In this embodiment, besides the parameters which are visible on the display, invisible parameters are provided for the game player including three parameters called "the level of mental underdevelopment", the "level of physical underdevelopment", and the "level of good luck" as well as the body ID which the microcomputer 21 gives to the communication game device based on the program. The details of these parameters will be given later.

The icon (2) "food" command is to give the virtual living object a "meal" or a "snack", and the number of "meals" or "snacks" can be increased every time the "meal" or "snack" is chosen.

The "meal" mode is provided with an "overeating" mode in which the player can give meals up to two more times after "the hunger" parameter 4 (a full stomach) is displayed. If another meal is given, a "no more" sign will be displayed. If a further "meal" is given, the "hunger" parameter and the "weight" parameter will increase by one.

Although a "snack" can be given at any time in principle, a case is provided where the virtual living object cannot eat while sleeping or under certain "sick" conditions. If a "snack" is given, the "hunger" parameter increases by one and the "weight" parameters increases by two. As an adult, if the weight reaches 99 g according to the way meals are given, a picture is displayed showing that the virtual living object is overweight. If the weight is reduced to 80 g after dieting by playing the mini games, a normal character is displayed. The program enables the control such that if the virtual living object becomes obese, the chance of the virtual living object getting sick increases and it becomes impossible for the virtual living object to have a meal, and the discipline mode will not be carried out.

The contents of the meals and the snacks given to the virtual living object (character) vary according to the growth stage and the kind of virtual living object (character). FIG. 8A shows the meals and snacks which can be given during different growth stages and FIG. 8B shows the meals and snacks for every character as an adult.

Figures 9A, 9B:
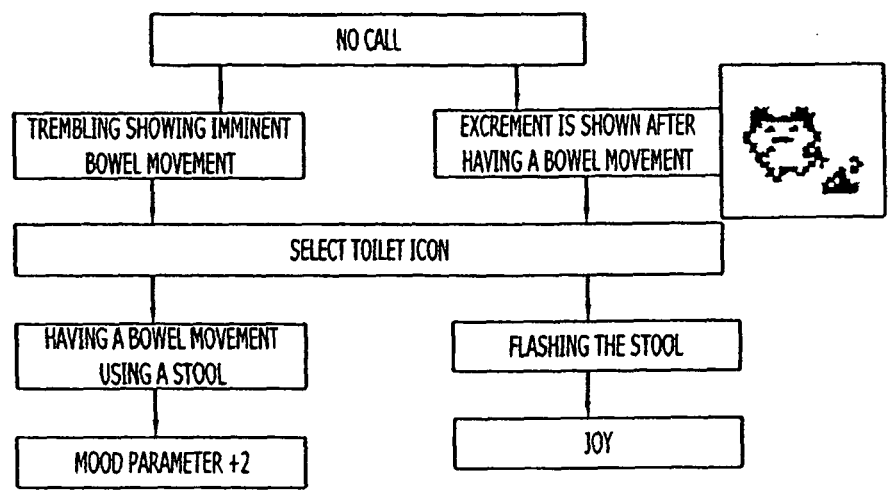
FIGS. 9A and 9B are diagrams explaining the outline of the control process carried out in the communication game device of the present invention when the virtual living object has a bowel movement.

The icon (3) "toilet" command is to delete a picture representing excrement on the display a certain period of time after the virtual living object has a bowel movement. The program enables the control such that if eight excrements are shown on the display, the virtual living object gets sick (cannot eat meals or snacks or the game can no longer be played) Whenever the hunger parameter decreases by two, the virtual living object has one bowel movement. The flow of control processing is shown in FIG. 9A for the case where the character has a bowel movement. In the flow of the control, a picture is shown showing that the virtual living object has uneasiness when the character has an imminent bowel movement. If a "toilet" icon is chosen in this state, a picture showing that the virtual living object is using the bowl and the "good mood" parameter increases by 2. In the state of being uneasy, when the player does nothing, the picture of the virtual living object and the excrement are displayed. If the toilet icon is chosen in this state, the excrement is flushed and the virtual living object is displayed as feeling comfortable.

Various bowls and various shapes of excrements are shown according to the growth stage of the character. (FIG. 9B).

The icon (4) "mini-game" executes a program which performs games including a "dance" game and a "hurdle" game. Except during sleep or illness, the player can choose to "dance" or "hurdle". The "arranged dating" process becomes available if the virtual living object becomes an adult.

In each mini-game, the player repeats the small game several times until the player fails or stops playing the game.

The reaction of the virtual living object and the parameter changes according to the level attained when the player stops playing the game (number of times).

In the "dance" game, the virtual living object is continuously shown as turning to the "left", "center", and "right" on the display, and the player is supposed to memorize the series of actions of the virtual living object and to input correctly the order of the actions of the virtual living object using at least one button. After one small game is successful and is completed, the virtual living object dances continuously, and the operation of inputting the order of operation which the game player memorized is continued. If the player clears 21 times or more, the weight will decrease by 2 g and the level of mental underdevelopment will decrease by one.

In the "hurdle" game, a hurdle is displayed moving from the right side to the left side and the virtual living object clears the hurdle by pressing a button with good timing. If the predetermined number of hurdles are cleared, the game will be concluded. If the hurdle is cleared 20 times or more, the weight will decrease by 3 g and the level of mental underdevelopment will decrease by one.

If the growth phase of the virtual living object comes to the "breeding age" as an adult and day one goes by, the "arranged dating" system becomes available. The "arranged dating" system is a command that executes a program in which the virtual living object gives birth to a baby having good luck of level 1 if the "arranged dating" is successful even if the player does not communicate with another game device.

In the "arranged dating" system, the player chooses one of four virtual living objects and the arranged dating is successful if both virtual living objects are chosen who will fall in love with each other and a heart sign lights up, and a baby is born. The game player can choose the partner up to 3 times per day, and the game player is supposed to choose an arranged marriage partner considering the personality of the character (virtual living object). The virtual living object can be chosen with the A button, and the character of the virtual living object can be displayed with the B button.

The rate of successful arranged dating changes with the level of good luck. The rate is also increased by 20% if the virtual living object has an item. A "debuchara" (obese character) has no chance of having a successful arranged dating experience.

If the "arranged dating" is successful, a baby may be born, but after childbirth, the life of the parent and the child lasts for three days (a picture showing the parents and the child is displayed), and the parent's numerical value is displayed as a parameter.

The icon (5) "communication" process executes programs which transmit and receive predetermined information to and from the partner device which is at the other end of the communication. Various processes, such as "play", "gift", "love", and "store communication", are performed, and predetermined image display processes correspond to the various procedures, such as "play", "gift", "love", and "store communication", are performed in each communication game device.

In the communication processes, transmission and reception of information are performed between the player and the partner devices using infrared rays. If communication is performed, the name (name data) of the communication partner's virtual living object will be memorized by the partner's communication memory part. Also, the "friendship level" between the communication partner's virtual living object and the virtual living object of the player's game device changes by repeating the communication performed after the initial communication, and the virtual living object is classified by "the friendship level" such as "acquaintance", "friend", "best friend", and "sweetheart".

In the communication process, the programs decide whether the partner device (virtual living object of the partner device) is the opposite sex, or what kind of relation is the friendship level, or perform various processes, such as the above "play", "gift", and "love" processes based on a predetermined probability. When the partner is a device installed in a store, the processing of the "store communication", which will be described later, is performed.

"Play" processing can be performed if the virtual living object of the player's game device is at any stage between childhood to an adult, even if the virtual living object of the other game device is at any stage between childhood to an adult. The games include a "tug-of-war" game (the party who pulls a rope and falls first means that the opponent wins), a "balloon" game (the party who pops the balloon first wins the game), and a "quick-eating competition" game (the party who keeps eating meals and falls down loses the game). The winner adds one point to the "good mood" scale and the loser loses one point on the "good mood" scale. The "friendship level" increases by 5% for both the winner and the loser.

The "tug-of-war game" is lost by the party who loses the rope and falls down.

The "balloon" game is a game in which the player starts pressing the button repeatedly on the "ready beat" to operate a pump, while a character is displayed who is jumping on the pump. The game is won by the party who pops the balloon first. The player who pressed the button more times than the other players goes one rank higher on the victory-or-defeat ranks shown in FIG. 10. The victory-or-defeat ranks are divided into five steps from ABCDE according to the number of times the player loses. Rank A is assigned for 0 losses. Likewise, the rank B is for 1 to 2 losses, the rank C is for 3 to 4 losses, the rank D is for 5 to 6 losses and the rank E is for 7 or more losses.

The "quick-eating competition" is a game in which the player, after starting to eat meals when the ready-go sign is shown, who is first to obtain a full meter and falls first is the loser. The player who has a lower hunger parameter goes up one rank on the victory-or-defeat conditions shown in FIG. 10 just before the game starts.

FIG. 10 is a table showing the victory-or-defeat conditions of the virtual living objects. The characters A, B, C, D, and E in the left column denote the ranks the virtual living objects attain, with A being the highest and E being the lowest in the following order: A>B>C>D>E.

The winner is determined based on their rank. For example, if the ranks of both players are the same as in the case where the rank of the player's game device is A and the rank of the partner's device is A', the winner is determined by a 50% probability. If the rank of the player's game device is B and the partner's device is A', the player loses the game. If the partner's device is B', the winner is determined by a 50% probability. If the partner's device has a rank of C' to E', the player wins. Likewise, the winner is decided based on the table shown in FIG. 10 for other combinations.

In "gift" processing, a picture sent from the player's game device to the partner's game device is displayed on the partner's display showing a virtual living object having a gift and putting the gift on the list or using the gift. The gift which is given to the partner cannot be chosen by the sending side, until it reaches childhood to an adult, but it is selected by the program manipulation by the receiving device according to the conditions shown in FIG. 11A, and it is displayed as if it was sent by the partner. The "friendship level" which expresses a mutual relationship is designed to be affected by the gift, such that the virtual living object gets a better gift from the virtual living object with a higher friendship level.

As an adult, if a gift is given, the friendship level will rise 15%, and the gifts shown in FIG. 11B are only given as an adult.

As shown in FIG. 11C, the nature of the friendly relationship (acquaintance, friend, close friend, best friend, sweetheart and ardent lover) is expressed by numbers. The friendship between opposite sexes and expressed by 81% or more can be described as an "ardent lover". If there are two or more ardent lovers, the partner with highest number is defined as the "ardent lover" and the others are called "sweethearts".

The "find-a-lover" process is performed more than one day after the virtual living object becomes an adult and only when the communicating partner device is of the opposite sex. In this process, the virtual living object gives birth to a baby for the next generation based on various parameters provided for the virtual living object on the sending game device as well as on the receiving side. This process is different from the "arranged dating" process using icon (4) "mini game" in that the former has a breeding partner (marriage) (a communicating partner exists) and that the level of good luck is predetermined.

Figures 12A, 12B:
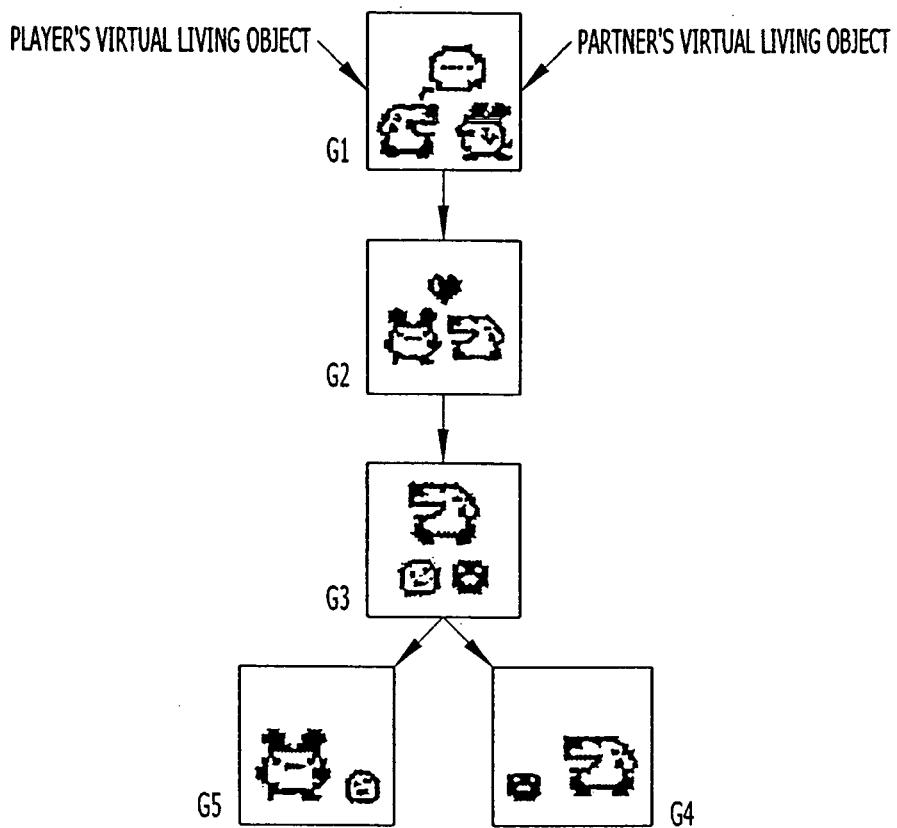
FIGS. 12A and 12B are diagrams explaining an example of the pictures displayed when the "find-a-lover" command is executed for the virtual living object and the levels of good luck used in the communication game device of the present invention.

The level of good luck of the newborn child is determined by a combination of the levels of good luck of both of the virtual living objects that breed (See FIG. 12B).

The details of the "find-a-lover" process will be given later.

In this process, a relationship of the virtual living object with the communicating partner of the opposite sex is closer than a "sweetheart" (i.e., the relationship between the virtual living object of the sending game device and the receiving game device is a "sweetheart" or an "ardent lover" or both), the relationship automatically shifts to "ardent lover" by a certain probability or 100% when the relationship is an "ardent lover".

In the "find-a-lover" process, a series of pictures are displayed on the display element 5 in the order shown in FIG. 12A. That is, the virtual living object of the player's game device and the virtual living object of the partner's device are displayed on the same display (picture G1), and then an animated picture with a heart mark is displayed as if they are talking to each other for a while (picture G2). Subsequently, pictures showing two children, a male and a female, are born and the virtual living object of the partner device accompanied by the child disappears from the picture (picture G3). At this moment, the picture of the virtual living object and the child of the player's game device is shown returning on the display element of the partner's device at the same time. Then, for a prescribed period of time, the picture of the virtual living object and a child virtual living object is displayed on both displays. Then after three days, the parents will disappear as their generation changes and the child virtual living object will repeat the growth process.

The icon (6) "Discipline" is a command executed by selecting the "discipline" icon to perform "patting" and "scolding".

Only during childhood or the teenage years, other than infancy and as an adult, a "selfish" call is performed every 3 hours after waking up. The "selfish" call represents a complaining sound such as crying in the night (generating a beep), or crying (only during childhood at 21:00 pm when the device is turned on) although the "hunger" parameter and the "happy" parameter indicate 1 or more (namely, there is no urgency involved). On this call, discipline (patting, scolding) must be performed. The indices of the "good mood" and "discipline" parameter mentioned above are affected by the response to the call. Namely, when "scolding" is carried out as the response, the "good mood" parameter decreases by one, and the "discipline" parameter increases by one. When "patting" is carried out, the "good mood" parameter increases by one and "discipline" parameter remains unchanged.

Moreover, a call for "patting" can be performed at all ages except as an adult. Up to the stage of childhood, the picture "crying" is displayed, and in the stage of a teenager, an animated picture showing "approach and pat me" is displayed depending on the kind of virtual living object. The call requires that "discipline" (patting or scolding) be done within a proper timing. The indices of the "good mood" parameter and "discipline" parameter mentioned above vary depending on the type of response to the call. Namely, when "scolding" is carried out as a response, the "good mood" parameter decreases by one, and the "discipline" parameter remains unchanged. The "good mood" parameter increases by one, and "discipline" parameter increases by one when "patting" is carried out in response to the call.

The icon (7) "Medical treatment" process shown in FIG. 5 executes the command which is a treatment of an "illness", and when there is a "sick sign" (a picture of the virtual living object accompanied by a skull shown on the display), this command is performed. The kind of illnesses include "decayed teeth" and a "Tamagotchi cold". A "decayed teeth" is caused by eating too many snacks (10 per day) during childhood and as a teenager, and that leads to a condition where he cannot eat snacks and meals anymore. The "Tamagotchi cold" is caused at all stages of growth. The Tamagotchi cold is caused by poor care using a certain probability. The Tamagotchi cold is also caused if eight different amounts of excrement are accumulated. The Tamagotchi cold can result in virtual living object being no longer able to play the game or that the virtual living object can not eat any meals. The illness is not cured unless the virtual living object is treated, and the virtual living object will die if the "Tamagotchi cold" is left untreated for 12 hours.

"Tamagotchi" is the registered trademark of BANDAI CO., LTD.

The icon (8) "Electricity" shown in FIG. 5 is a command to turn on or turn off the light. If "turn off" is selected by the "electricity" icon, the display turns dark (all liquid crystal segments are displayed) and if "turn on" is selected, the virtual living object is visible on the display as in a normal display.

Figure 13:
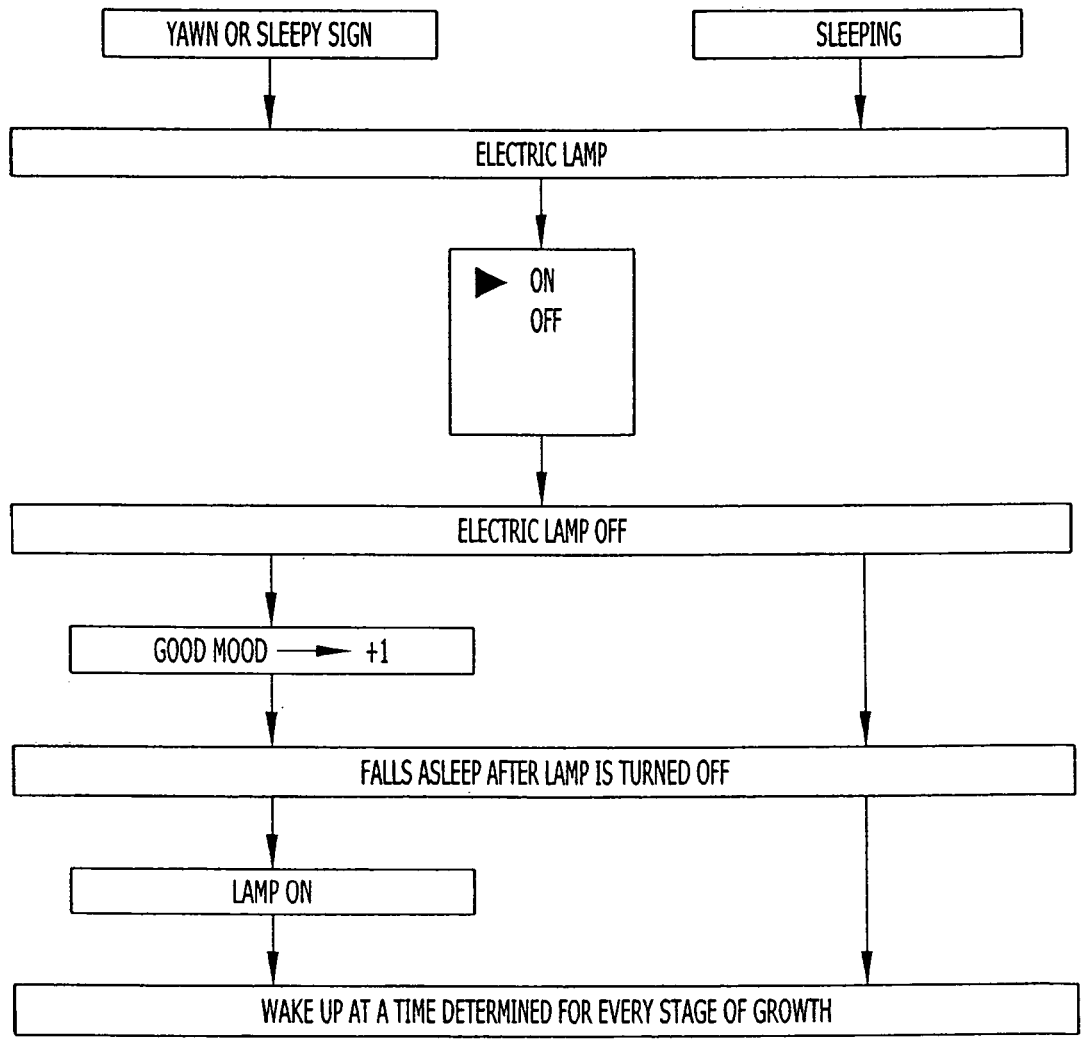
FIG. 13 is a flow chart showing the processes performed when the "yawning or sleepy" or "sleeping" pictures are displayed for the virtual living object in the communication game device of the present invention.

Each virtual living object has a bedtime predetermined for every growth stage (no call is made except for the above-mentioned "selfish" call, etc.). FIG. 13 is a flow chart showing the flow of the processing performed when a picture of "yawn and sleepy" sign is displayed showing that the virtual living object is feeling sleepy, or when a picture of the virtual living object "sleeping" is displayed.

If the electric icon "turn off" (turning off the lights), is used when the virtual living object shows "yawning and sleepy" sign, the "good mood" parameter increases by one, the light is turned off, and the virtual living object goes to sleep. Subsequently, when it is a time in the morning set for a growth stage, the virtual living object wakes up and the light is automatically turned on (the electric icon turns on at this time).

If the electric icon "turn on" is selected during bedtime (that is the light is on), various event pictures are displayed according to the growth stage and the kind of virtual living object as shown in the table of FIG. 13.

The icon (9) "Notebook" command shown in FIG. 5 is a command to display, by choosing "the friend (friend list)" and the "gift" which are subcommands of the notebook command. These show a list of the virtual living objects recorded in other game devices communicating with the player's game device and to display gifts received from the other players' game devices.

The communication game device of the present invention is capable of storing parameters of another game device in the player's memory section when the communication commands, such as "play",% "gift" and "find-a-lover" mentioned above, are executed. The parameters of the virtual living object of another game device are updated if new information about a growth stage, a parameter, etc. of the virtual living object of the other device is detected when the player's game device communicates with that device several times.

The friend list shows names of the arbitrary virtual living objects in the order of communication. These names have been given by the game partner to the virtual living object of his game device. If a name is selected from the friend list, the picture of the virtual living object of the partner's game device (character picture corresponding to the "character number" (picture ID) memorized in the communication partner memory part) and the relationship between the virtual living object of the player's game device and the virtual living object of the partner's game device (the relationship determined according to the friendship level mentioned above: See FIG. 1C) is displayed.

Every time ten friends are listed as a result of various communications, an image showing a congratulations banner is displayed, and a special cake which is not served on normal occasions is served. The special cake refers to snacks which can be eaten bringing the "good mood" parameter to the top without increasing the weight.

The communication game device of the present invention is capable of storing items "the gift given by the friend by communication" and items "the gift received in the seasonal event" under "a gift (item)" (See FIGS. 11A and 11B), and the given gifts can be used. The "gift" parameter is reset at the end of a generation.

If the "gift" icon is chosen, the given items are displayed and an item is selected by the B button. A picture showing play using the item is also displayed. An example of a type of play is "changing clothes". When the item is used, the "good mood" scale will go up one point. If a wearable item is selected, the play mode of "changing clothes" can be performed. When "changing clothes" is carried out and any further action is carried out, changing-clothes mode is canceled.

The icon (10) "Call sign" command shown in FIG. 5 is a command to be chosen when a call is made by a virtual living object by a sound or an image display and the game player answers the call.

Following the preceding explanation about the operations and parameters relating to the icons 13-15 (commands (1)-(10)), the operations and parameters performed during 3 days after breeding (or after a successful arranged dating) by selecting the icons 13-15 when two virtual living objects (parent-child mode) exist will be described below.

On selecting the icon "parameter check", a picture relating to the parent's condition is displayed. On selecting the icon "meals", if a "meal" is given to a parent, the parent divides the meal and a portion of the meal is given to a child. If the parents will not accept it, the child is also shown on the display declining it. On selecting the icon "mini-game", a picture is displayed showing the parent playing a game with the child. When the game is over, the child is shown expressing joy depending on the result of the game. An arranged dating cannot be chosen between the parent and child. On the icon "toilet", in addition to parent's excrement, child's excrement is shown (1 time every hour). The child's excrement disappears in every 15 minutes (implying that the parent has cleaned it up). If the toilet icon is selected, a picture is displayed showing that the bowl is flushed. If a toilet icon is selected when parent's and child's excrement are shown, both excrements disappear simultaneously. On selecting the "Discipline" command, a picture is displayed showing that the child is angry when the parent scolds the child for reasons other than "being selfish". On selecting the "medical treatment" command, in addition to the parent's illness, the child also gets sick (2 times a day). Therefore, the treatment of the illness is performed for both parent and child. On selecting the "electricity" command, since the parent's wake-up time or bedtime governs the child's behavior, operations are required for the child's actions following the parent's actions. The "communication" command cannot be selected in the parent-child mode. Also, "communication play" command cannot be chosen in the parent-child mode. On selecting the "notebook" command, for a friend list, the parent's friend list is displayed and for an item list, the item list which the parent has collected is displayed. In a case where the parent and the child are seriously ill, and the parent dies, the child also dies.

On the third day of the parent-child mode display at about 12 o'clock midnight, the parent disappears (implying separation of the parent from the child (leaving a nest)). Under this circumstance, if the power is on, the pictures will be displayed for this situation. From the next day on, the parameters for the child are displayed and care will be done only for the child. The parent's friend list is given to the child as his own friend list. The parent's "item list" also disappears as the parent dies, which implies that the parent took it away.

If the B button 9 is pushed at the initial picture (a picture waiting for an operation), the display shifts to the clock mode. The clock mode is designed to accept a setup change and date change including a time change. The date and time are controlled by the microcomputer 21 (See FIG. 2), and are updated using the clock pulse generating means 27. The date and time are also set up during the initial use together with other information.

If the A button 7 and the C button 11 are used simultaneously, an alarm sound generated by a buzzer 31 can be set up. The buzzer 31 generates sounds at the operation of each button as well as at the time of a call from a virtual living object. The A button 7 and the C button 11 are pushed simultaneously to generate or erase sounds.

Next, an outline of the communication game device of the present invention is explained. As described above, the communication game device of the present invention displays pictures of the virtual living object on the display element 5, communicates between the game player and the virtual living object, and simulates the steps of growth of the virtual living object. In the device, the characteristics of the virtual living object are defined by parameters which the game player can check and by hidden parameters which the game player cannot check. Each parameter is determined by the way the player responds to the virtual living object and by the contents of the communications with the other game devices.

The main exchange performed between the virtual living object and the player includes "a call" to the game player from the virtual living object.

The call is generated based on the conditions of the parameters set for the virtual living object and the time which have been set by the program. The call is performed by generating sounds called "sign sounds". A lighting device, such as a light emitting diode, can be provided together with sound on the main body 1.

A call is generated under the following situations: "hunger parameter is 0", "bedtime", "pat me please", "selfish sign" and "happy parameter is 0".

If there is a call, the game device determines whether there is any response to the call (care) within 15 minutes of the call. If there is no response to the care, one mistaken care count is recorded.

The virtual living object becomes "seriously ill" when the lifetime of the virtual living object comes to an end or the above-mentioned care is not taken. In the "seriously ill" process, a blinking picture of a skull is shown on the display along with an alarming sound for a minute and then a picture of a grave is displayed indicating that the virtual living object has died.

The conditions which satisfy the state of "seriously ill" include those cases where the virtual living object is neglected for 12 hours with the hunger parameter being 0, where the virtual living object is neglected in a state of being "seriously ill" for 12 hours, where the virtual living object gets sick four times during a single growth stage and where three days have passed after the "ojitchi" or "otokitchi" is displayed.

The contents of each parameter will be explained below with reference to FIGS. 6 and 7.

FIG. 6 shows a list of the parameters which can be checked in the icon (1) "parameter check" command mentioned above.

By choosing "meals" in the above-mentioned icon (2) "food" command, the "hunger" parameter increases by one within the range from 0 to 6, and decreases by one after a predetermined period of time. The parameter is expressed on the display by four or less heart marks. When the "hunger" parameter indicates 0 and the above-mentioned call is made, a mistaken care count is recorded for the neglect every predetermined time (15 minutes). The weight parameter decreases while the "physical underdevelopment" parameter which is a hidden parameter increases after every predetermined time (such as 1 hour).

A "good mood" parameter increases by one if a "snack" is selected using the icon (2) "food" command within the range of 0 to 5 or by executing the icon (4) "mini-game" command. The parameter decreases by one with a lapse of a predetermined period of time. When the "good mood" parameter indicates 0 and the call is made, a care mistake count will be recorded for the neglect of every predetermined period of time (15 minutes). Also the "mental underdevelopment" parameter, which is a hidden parameter, increases by one.

The "discipline" parameter varies within the range of 0 to 9 depending on whether "patting" or "scolding" is selected using the icon (6) "discipline" command. The parameter is expressed by a bar chart. If "patting" is selected, the "good mood" parameter and the "discipline" parameter increases by one. If "scolding" is selected, the "good mood" parameter decreases by one and the "discipline" parameter increases by one.

The "age" parameter is expressed by the day and the parameter is displayed based on the accumulated days that the virtual living object lives.

The "weight" parameter is a number (g=grams) and the parameter increases by giving "meals" or "snacks", and decreases by playing the "mini-game". The parameter also decreases by 1 g every hour when the "hunger" parameter indicates 0.

The "name" parameter is the name of the virtual living object given by the game player at the initial operation of the device or on the birth of a new virtual living object and is displayed by name. The name cannot be changed once it is recorded.

The "male/female" parameter is for indicating the sex of the virtual living object. The sex is determined by birth based on the program.

The "generation" parameter indicates the generation of the virtual living object at the growth stage.

FIG. 7 shows a list of hidden parameters which are not displayed and therefore the game player cannot see.

"The level of physical underdevelopment" indicates the level of physical underdevelopment of the virtual living object due to mistaken care of the Tamagotchi. The parameter increases by the number of mistakes for the "hunger" parameter, increases by the number of mistakes in the "treatment" parameter (medical treatment of illness), and increases by the number of mistakes in the "discipline" parameter (scolding). It decreases by one if more than 20 hurdles are cleared in the "hurdle" game of the "mini-game". The parameter affects the conditions under which the character changes over time.

"The level of mental underdevelopment" parameter indicates the level of mental underdevelopment due to mistaken care of the Tamagotchi. "The level of mental underdevelopment" increases by the number of mistakes in the good mood parameter, by mistakenly putting the virtual living object to bed, and by a mistake in patting. It decreases when more than 21 times are recorded in the "dance" game of the "mini-game". The parameter affects the conditions under which a character changes over time.

"The level of good luck" determines the good luck of the Tamagotchi. "The level of good luck" is determined by the birth depending on the parents' relationship (with no change). The level of good luck is divided into 1-5 steps which affect the level of the partner of an arranged dating and "the level of good luck" of the child.

The above parameters are memorized by the parameter memory part provided in the EEPROM 23. FIGS. 35A, 35B, 35C and 35D show the map of a parameter memory part.

The "hunger" parameter is memorized in the NAME area from 4-7 of ADDRESS 013. Similarly, the "good mood" parameter uses the NAME area from 0-3 of ADDRESS 013, and the "discipline" parameter uses the NAME area from 0-3 of ADDRESS 012.

The "age" parameter is memorized using the NAME area from 0-7 of ADDRESS 00B. The "weight" parameter is similarly memorized using the NAME area from 0-7 of the ADDRESS 00D.

The "name" parameter is memorized at each ADDRESS by one character using the NAME from 0-7 of ADDRESS 003, and a total of five characters are memorized.

The "male/female" parameter is memorized using the NAME area 0 of ADDRESS 00E, wherein the "0" indicates a "male" and "1" indicates "female".

The "generation" parameter is memorized using the NAME area from 0-7 of ADDRESS 00C.

As for the hidden parameters, the "level of physical underdevelopment" parameter is memorized using the NAME area from 0-7 of ADDRESS 014 and the "level of mental underdevelopment" parameter is memorized using the NAME area from 0-3 and the "level of good luck" parameter uses the NAME area from 4-7 of ADDRESS 015.

The daily schedule of the virtual living object will be explained below. FIG. 14 is a table showing the daily schedule of the virtual living object during childhood and as a teenager.

During childhood, the virtual living object is shown waking up at 9:00 a.m. and yawning from 9:00 a.m. until 10:00 a.m. From 10:00 a.m. until 11:00 a.m., a simple picture of the virtual living object appears, and from 11:00 a.m. to 6:00 p.m. a picture appears showing the virtual living object playing alone. The simple picture of the virtual living object is displayed again at 6:00 p.m. to 7:30 p.m. and from 7:30 p.m. until 8:00 p.m., a picture is displayed showing the virtual living object yawning and going to bed at 8:00 p.m. The Tamagotchi is designed to make a cry at night, a type of "selfish call" described above, from 9:00 p.m. until 9:30 pm. As a teenager, the characters of the virtual living object are divided into four types a, b, c, and d according to the state of a hidden parameter. As shown in FIG. 14, a daily schedule is defined for each of these types of the character.

As an adult, the virtual living object spends a day according to the schedule shown in FIG. 15 depending on the character A, B, C, D and E of the virtual living object shown in FIG. 4. The daily schedules include actions which are called "events" and are displayed at a predetermined time. The events include "tooth brushing", "yawning", "crying at night", "taking a bath", and "playing alone".

"Tooth brushing" is displayed according to the result of a lottery performed once in every 5 minutes.

"Yawning" includes "yawning in the morning" and "yawning at night". "Yawning in the morning" is displayed with a 50% probability according to the result of a lottery performed once every 15 minutes during a predetermined time period and "yawning at night" is displayed with a 50% probability according to the result of a lottery performed once in every 5 minutes during a predetermined time period.

"Crying at night" is performed only during childhood at 9:00 p.m. when the light is turned on. The virtual living object starts crying at this time. The player cares for the virtual living object during "crying at night", by patting the virtual living object within 15 minutes of crying followed by turning off the light. A failure to pat the virtual living object within 15 minutes results in one point being lowered in the "good mode" scale.

"Taking a bath" is performed by displaying a picture at predetermined time for 30 minutes which shows the virtual living object taking a bath. When other operations are carried out during this event, the picture disappears.

In "playing alone/play with an item", a picture is displayed based on a 50% probability after a lottery is performed once every 15 minutes during childhood. The pictures displayed in the event include five kinds of play including "play with an item". A decision on which picture is displayed is made as follows: for the first five showings, a picture is chosen which has never been displayed. For the sixth and further showings, a picture is chosen randomly from the five previously shown pictures. As a teenager, the lottery is performed once in every 30 minutes and a picture is shown with a 50% probability. A picture is shown following the order of priority of a "seasonal event", "play with an item", and "playing alone". After all the different kinds of "playing alone/play with an item" have been shown, a picture is chosen randomly from all of the different kinds of pictures. A list of pictures displayed in the "playing alone/play with an item" modes is shown in FIG. 16. As seen from the list, different pictures are displayed at different stages such as childhood, teenager and adult.

The communication game device of the present invention can display pictures associated with the seasons depending on the date because a main feature of the communication game device of the present invention is that it includes a calendar function. Examples of an image display according to the season are shown in FIG. 17.

Various event pictures are displayed on January 1-3 for the "New Year". "Happy New Year" is displayed at 0:00 o'clock on January 1$^{st}$. At wakeup time, the picture of a "kadomatsu" (gate ornament using pine branches) is displayed (it will disappear, if there is a following action). Also, in the "playing alone" mode, the shishiodori (lion dance) is performed.

On February 3, pictures showing a surprised ogre or a goddess of fortune are displayed in the "playing alone" mode to celebrate the "eve of the beginning of spring".

On "St. Valentine's Day", February 14, pictures showing a male character having chocolate as a gift from a friend are displayed to commemorate the day or pictures showing a male character having chocolate are displayed at the time of the "playing alone" mode based on the probability of the level of good luck.

On "Girl's Festival Day", March 1-3, a picture showing a "paper-lantern" is displayed to commemorate the event. The blinking lantern is shown at the wake-up time and disappears if there is any further action taken.

On "White Day", March 14, a picture showing a female character having a cookie as a gift from a friend is displayed to commemorate the event. During the "playing alone" mode, the female character can get a cookie using a probability based on their level of good luck.

On "April Fool's Day", April 1, a picture showing a character pretending to be dead is displayed at the time of the "playing alone" mode to commemorate this day. During April 3-10, in the "playing alone" mode, a picture showing a cherry blossom viewer is displayed.

On "Children's Day", May 1-5, a picture showing a carp streamer is displayed in the morning (it disappears if another action is taken).

During June 15-30 when the rainy season sets in, a picture of a paper doll is displayed at wake-up time to wish for fine weather (it disappears if another action is taken).

On the "Star Festival Day", July 7, a picture showing the "Milky Way" is displayed in the "playing alone" mode at 5:00 pm to commemorate the event.

On August 15-17, a picture showing a ghost is displayed as an event of the "Bon Festival" during the "playing alone" mode. On August 20, a picture showing "exploding fireworks" is displayed in the "playing alone" mode time after 17:00 as an event of the "Summer Festival" and a picture showing "carrying mikoshi" is displayed during the "playing alone" mode time.

On September 17-19, a picture "showing a character viewing a full moon" is displayed after 17:00 during the "playing alone" mode as an event of the "full moon".

On October 10, "Health Sports Day", a picture showing a hurdle competition is displayed during the "playing alone" mode as the event of the season. On October 31, a picture is displayed showing a "pumpkin monster" for "Halloween" during the "playing alone" mode.

On November 15, a picture is displayed showing a 3 year-old, 5 year-old, and 7 year-old virtual living object (Tamagotchi) getting a gift at wake-up time to celebrate the "Shichi-go-san" holiday.

On December 20-25, a picture of a tree is displayed at wake-up time to celebrate "Christmas" (it disappears when another action is taken). At midnight on December 24, a picture is displayed showing Santa Claus bringing presents during the sleeping time. The countdown for the New Year starts 5 seconds before the New Year, and the numbers 5, 4, 3, 2, 1, are displayed, and a picture showing "Happy New Year" is displayed.

The main control process related to communication with other communication game devices of the present invention will be explained hereafter using the flow charts shown in FIGS. 18-32. (The terms such as "other devices", a "partner device", and the "receiving game device" are also used herein to refer to these other communication game devices).

Figure 18:
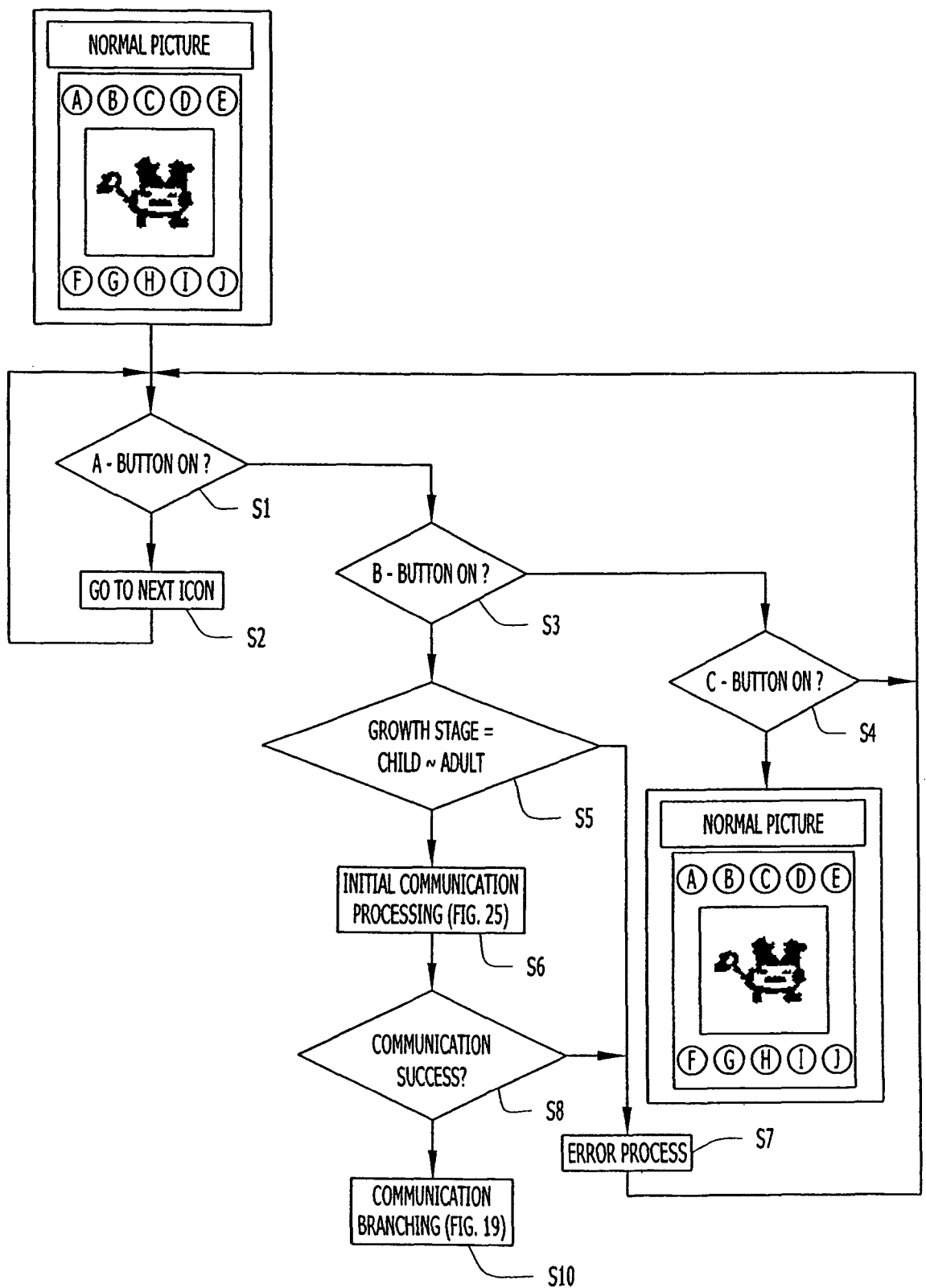
FIG. 18 is a flow chart of the initial steps of the communication process in the communication game device of the present invention.

FIG. 18 is a flow chart showing the initial processing steps when the communication starts. In a picture indication (usually a stand-by picture) as shown in FIG. 1, the icon ("E icon" in FIG. 18) of (5) is chosen with the A button, and the predetermined processing starts by determining the selection icon with the B button. The picture indication in the initial state where no operation is selected is referred to as a "stand-by picture". If the A button is pushed (Step S1) on a "stand-by picture", the (1) icon (see FIG. 18: A icon) will be chosen. The successive icons (2), (3), - - - will be selected by pushing the A button continuously (Step S2) until a desired icon is displayed. If the B button is pushed in the state where a desired icon is displayed, the selection will become final and conclusive (Step S3), and if the C button is pushed, the selection will be canceled and the display will return to the "stand-by" picture (Step S4).

If the "E icon (5)" is chosen in Step S3, the growth phase of the virtual living object will be decided based on a "generation" parameter memorized by the parameter memory part in Step S5. The kinds of growth phases are shown in the column indicated as the "growth stage" in FIG. 8A. A decision is made about whether the virtual living object is in a growth phase such as childhood, teenager, or adult in Step S5, and if so the process moves to the initial communication process ("waiting for reception" state shown in FIG. 25) (Step S8). In addition, if the virtual living object is a baby, the process performs "error processing" and returns the icon selection picture to a normal picture (Step S7).

Figure 19A:
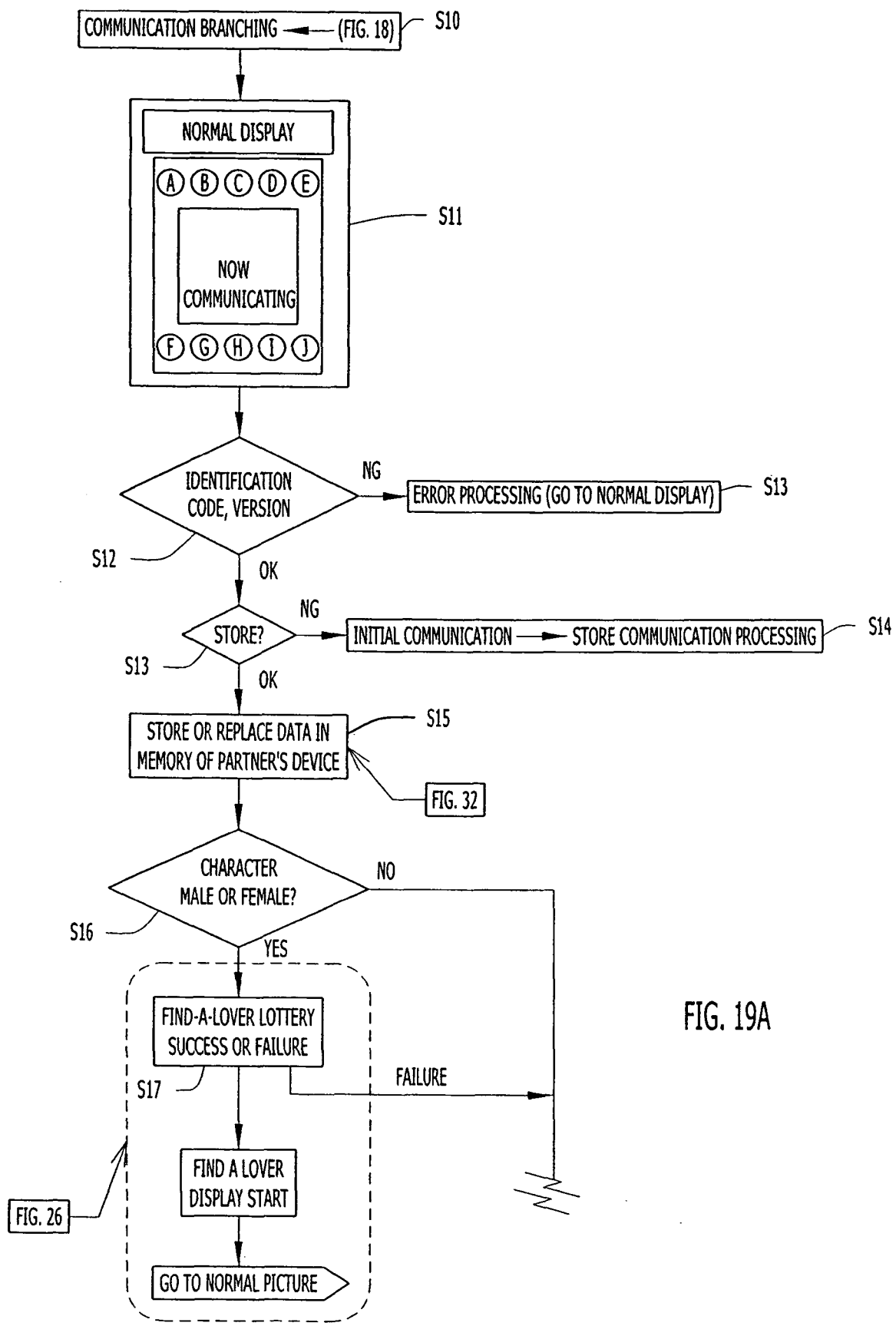
FIGS. 19A and 19B comprise a main flow chart at the time of the communication in the communication game device of the present invention.
Figure 19B:
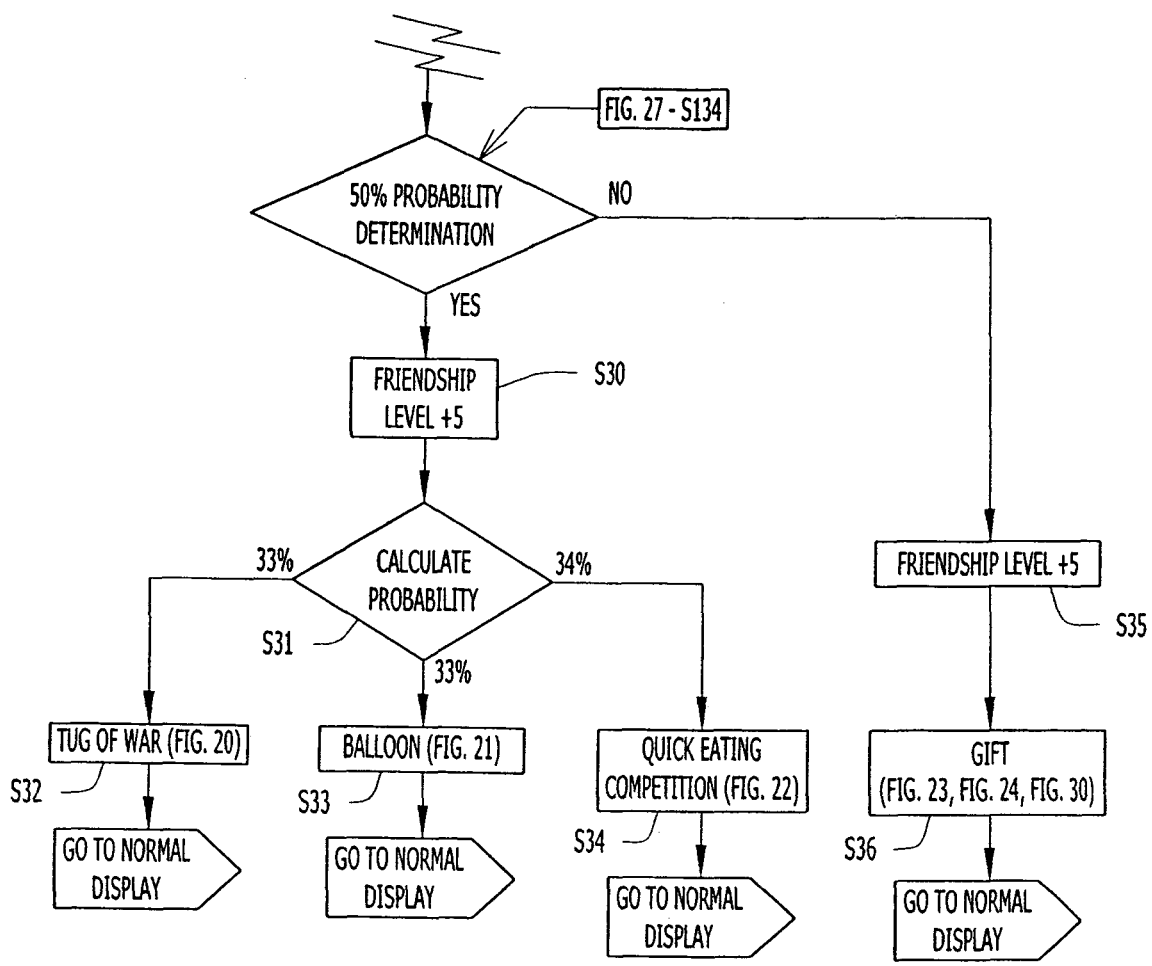

In Step S6, the initial communication process is performed with the partner device. In Step S6, if communication with the partner device is successfully performed (Step S8), the "communication branching" process is performed as shown in FIGS. 19A and 19B.

Figure 25:
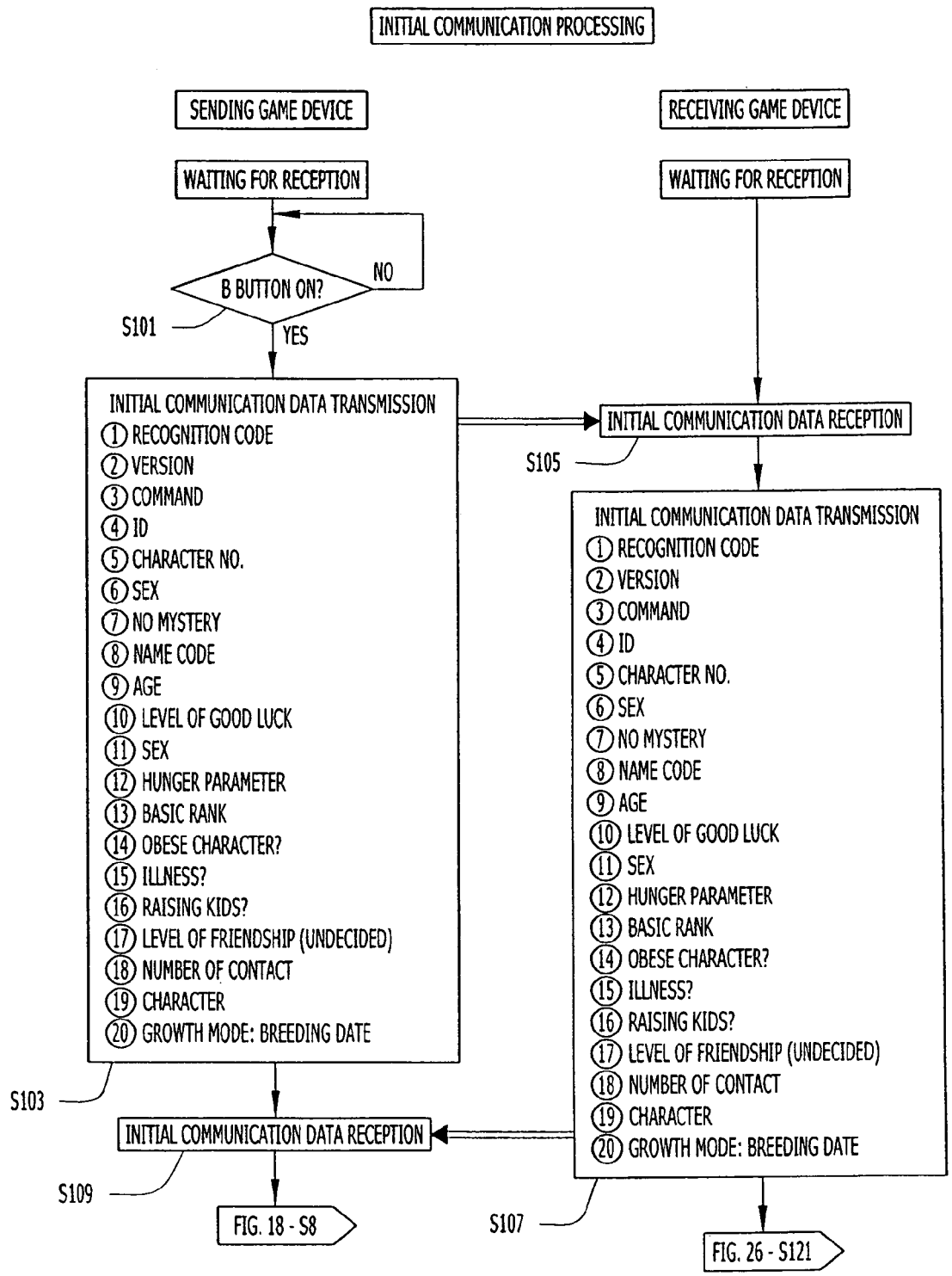
FIG. 25 is a flow chart of the "initial communication" processing steps of the communication game device of the present invention.

The details of the initial communication process (Step S6) are explained using FIG. 25. In FIG. 25, the processing of the sending communication game device (the game device that starts the transmission first) is shown on the left side, and the processing of the receiving communication game device is shown on the right side. Similar to the steps performed in the sending communication game device, Steps S1-S5 are performed in the receiving communication game device prior to the initial communication process to put the device into a state of "waiting for reception" indicated in FIG. 25.

The "B button" on either the sending game device or the receiving game device is pushed when both of them are at the "waiting for reception" stage (Step S101). The communication game device whose "B button" has been pushed transmits the "initial communication data" stored in its memory as the sending game device to the partner device (receiving game device) (Step S103). The "initial communication data" includes parameters such as the "recognition code", "version", "ID" (body ID), "character number" (picture ID), "sex", "no mystery", "name code" (name data), "age", "level of good luck", "friendship level", "hunger parameter", "basic rank", "obese ?", "illness ?" etc. An outline of these parameters will be explained below.

If the "initial communication data" signal is received by the receiving game device (Step S105), the "initial communication data" stored in the receiving game device is transmitted to the sending game device (Step S107), and the "initial communication data" will be received by the sending game device (Step S109). Thus the initial communication process is completed.

An outline of the above "initial communication data" will be explained referring to FIGS. 36A, 36B, 36C and 36D.

The "recognition code" is a code for the recognition of the device expressed in 8 bits. The recognition code identifies the difference in the hardware configuration. For example, the communication game device of the same hardware configuration has the same recognition code, but a communication game device of a different hardware configuration has a different recognition code even if the game device can communicate with the game device having a different code.

The "version" is information expressed in 8 bits which varies depending on the kind of character picture (picture of the virtual living object) to be displayed, or the relationship between the memorized character picture and the picture ID. The "version" is a "memory picture code" and is memorized in the memory picture code storage part provided in the EEPROM 23.

The "command" is information expressed in 8 bits according to the communication currently performed. In the case of the initial communication process, a code of the "initial communication" is set for the sending game device and a code of an "initial communication response" is set for the receiving side.

The "ID" is the information (body ID) which a calculation processing section gives randomly at the time of reset (such as at the time the battery is exchanged, etc.) to a communication game device using a number selected from 0 through 256 based on the control program. The information is used in combination with the "name code" explained below in order to identify a partner's communication game device. The "ID" is memorized the NAME area from 0-7 and the ADDRESS 000 of the map of the parameter memory part shown in FIG. 35A. The information is looked up according to the communication process.

The "character number" is expressed in 6 bits and is given to each of the various virtual living objects as a code (picture ID). About 35 different codes are provided. The "character number" is memorized in the parameter memory part in the NAME area from 0-7 of the ADDRESS 00A in the map of the parameter memory part shown in FIG. 35A. The information is looked up and read according to the communication process.

The "sex" is expressed in 1 bit to indicate the sex of the character. The sex code is set up using the "male/female" parameter memorized in the parameter memory part.

The "no mystery" is one-bit information. The code takes "0" which is defined as "mysterious" when the "version" information sent from the communication partner (picture code) is different from the "version" of the player's game device. However the code takes "1" which is defined as "no mystery" when the "version" information sent from the communication partner (picture code) is the same as the "version" of the player's game device.

The "name code" is five characters of information that the game player can give to each of the virtual living objects as a name when the game device is reset. The code is set by the "name" parameter memorized by the parameter memory part.

The "Age" is 7 bits of information. Up to 99 years old is stored and is set up by the parameter which is memorized in the memory part.

The "level of good luck" is information expressed with 3 bits, and affects the level of good luck of the child born depending on the congeniality of both parties at the time a lover is found. It is determined by the "level of good luck" parameter memorized in the parameter memory part.

The "hunger" parameter is a three-bit parameter which affects the result of "quick-eating competition". The parameter is determined by the "hunger" parameter memorized in the parameter memory part.

The "basic rank" is 3 bits of information. The "obese?" feature is one bit of information. The "illness?" feature is one bit of information. All of these different kinds of information affect the outcome of the "play" mode. The "obese?" and "illness?" features are set up based on the information stored in the parameter memory part (stored respectively in the NAME area 0 of ADDRESS 00E and NAME area 1 of ADDRESS 016 in the map of the parameter memory part shown in the relevant portion of FIG. 35). The "basic rank" will be described later.

The "friendship level" is information expressed with 3 bits and is determined by the relationship with the partner device at the time of communication. The parameter affects the communication branch depending on the friendship level with the partner. In the initial communication process stage, since a receiving partner cannot be identified (for example, as in the case where among the names of the virtual living objects, which partner the player is trying to communicate with is not yet known), the friendship level transmitted to the receiving game device from the sending game device is not decided by the sending device.

The "number of encounters" increases by one every time communication is performed with the communication partner already remembered in the communication partner memory part.

If transmission and reception of the above "initial communication data" are completed normally, the communication branch processing (Step S10) shown in FIGS. 19A and 19B is performed. At this time, a picture showing that the device is communicating is displayed (Step S11).

After the initial communication process, the sending game device checks the received "recognition code" and the "version" to confirm that the receiving game device is able to communicate with the sending game device (Step S12). After the confirmation, if the receiving game device has been found not to be communicating with the sending game device, the communication process is interrupted as a "communication error" (Step S13), and the display returns to the "normal picture".

In the case where the Step S12 shows that the partner device can communicate with the player's game device, a decision is made in the next step (Step S13) whether the communication partner's "recognition code" is a "store code". The "store code" in the "recognition code" is used only for a communication game device installed in a store which is able to communicate with a communication game device. By the decision process, it is decided that the communication partner is a device installed in a store and the process shifts to the "store communication process" shown in FIG. 31 (Step S14).

When a communication partner is other than a device installed in a store, a step of "storing memory or memory updating of the communication partner memory part" is performed based on the initial communication data of the received partner device (Step S15).

The "friend list" contains information about the virtual living objects of the partner device which communicated with the player's game device at least once and whose information was stored in the communication partner memory part. The communication partner memory part is provided in the EEPROM 23, which is a non-volatile memory.

The communication partner memory part stores information as a "new memory" about a new communication partner who communicated for the first time. The information transferred includes the "ID" (body ID) of the partner device, and the "character number", "sex", "no mystery", the "friendship level" (in the case of the partner who is communicating for the first time 0%), the "relationship" based on the "friendship level" and the "number of encounters" of the virtual living object of the partner device. The communication partner memory part also renews the stored information as "updated information" about the virtual living object of the partner device which communicated in the past including the "character number", the "friendship level", the "relationship", and the "number of encounters". The virtual living object of the communication partner is identified by the data stored in the communication partner memory part including the "name" in combination with the "ID". Since the "name" of the virtual living object is given to the virtual living object by the player, the same "name" may be used by another game player. In the case mentioned above, the communication game device of the present invention is capable of identifying a communication partner's virtual living object by checking not only the "name" of the virtual living object but also the "ID" (specifically 256 kinds of numerals) provided for every communication game device so the virtual living object with an identical name having a different ID cannot be misidentified.

FIGS. 37A, 37B, 37C and 37D show a map of the communication partner memory part provided in the EEPROM 23. The information on a first communication partner is stored in the ADDRESS 040 to 04F, and from ADDRESS 050 to 05F for a second partner, ADDRESS 060 to 06F for a third partner and ADDRESS 070 to 07F for a 4th partner. It is possible to increase the memory area for more than four game devices as required.

Explaining the structure of a communication partner memory part taking ADDRESS 040 to 04F as an example, the "ID" is memorized using the NAME area from 0-7 of ADDRESS 040. Similarly, the "character number" is memorized using the NAME area from 0-5 of ADDRESS 041, the "relationship" uses the NAME area from 4-7 of ADDRESS 042. The "name" codes are stored in the NAME area from 0-7 of ADDRESS 3-7, each ADDRESS storing one character for a total of five characters. "The friendship level" is stored in the NAME area from 0-7 of the ADDRESS 048 and the "number of encounters" is stored in the NAME area from 0-7 of ADDRESS 049. The NAME area 6 of ADDRESS 041 stores the "sex" information about a communication partner's virtual living object and the NAME area 7 stores information about the "no mystery" code obtained in the initial communication process.

Based on the sex of the partner device, after the above-mentioned "memory and updating" of the communication partner memory part process (Step S15), a decision is made about whether the communication partner is of the same sex or of the opposite sex (Step S16). If a decision is made that the communication partner has the opposite sex, the process goes to the "find-a-lover lottery" process shown in detail in FIGS. 26A and 26B. If a decision is made that the communication partner has the same sex, the process goes to the "tug-of-war" game (See FIG. 20 for details), the "balloon" game (See FIG. 21 for details), the "quick eating" game (See FIG. 22 for details), or to "a gift" presentation (See FIGS. 23, 24, and 30 for details) according to the probability determined for each of these processes.

The "find-a-lover lottery" process will now be explained.

Figure 26A:
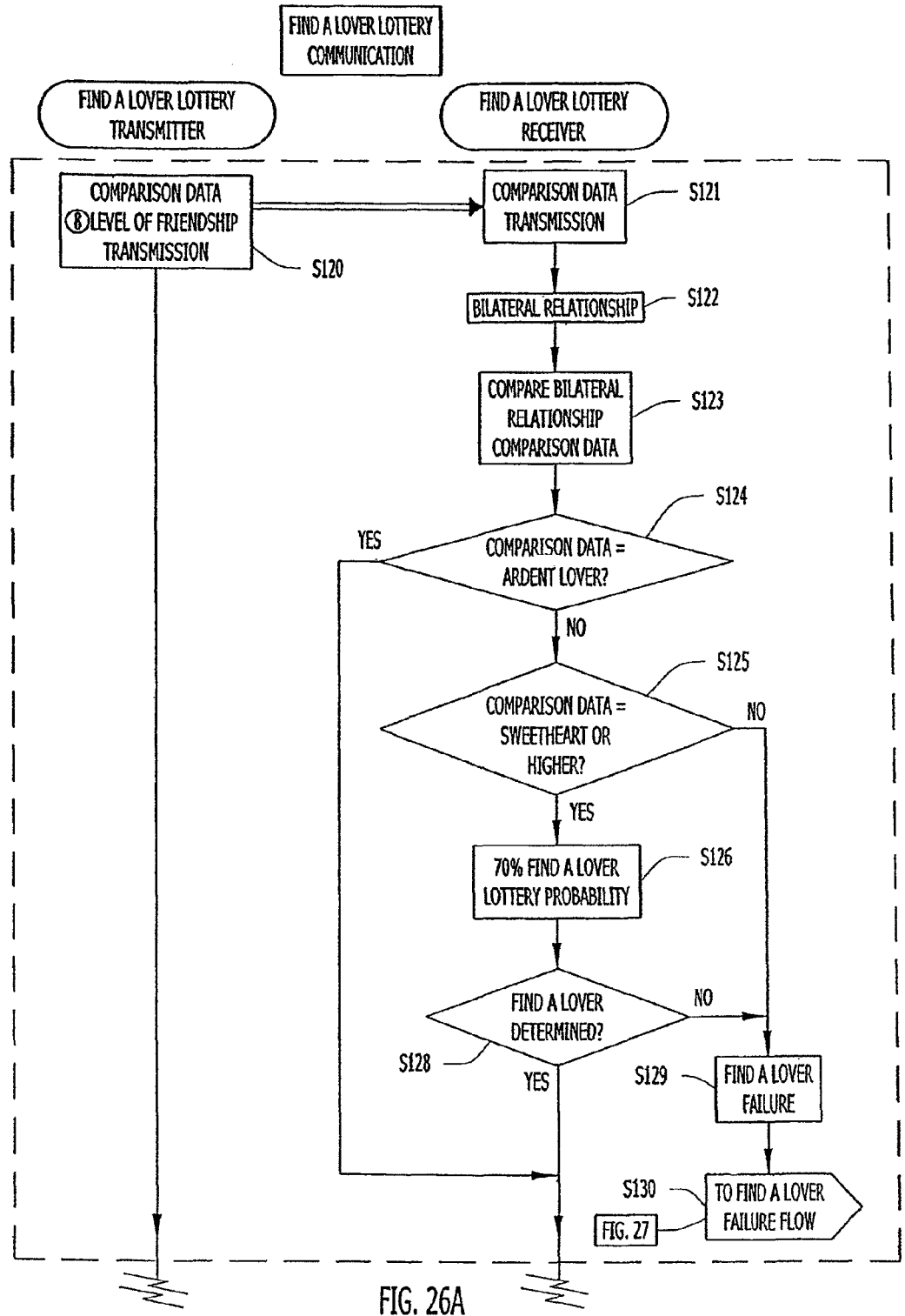
FIGS. 26A and 26B are flow charts showing the "find-a-lover lottery" processing steps of the communication game device of the present invention.
Figure 26B:
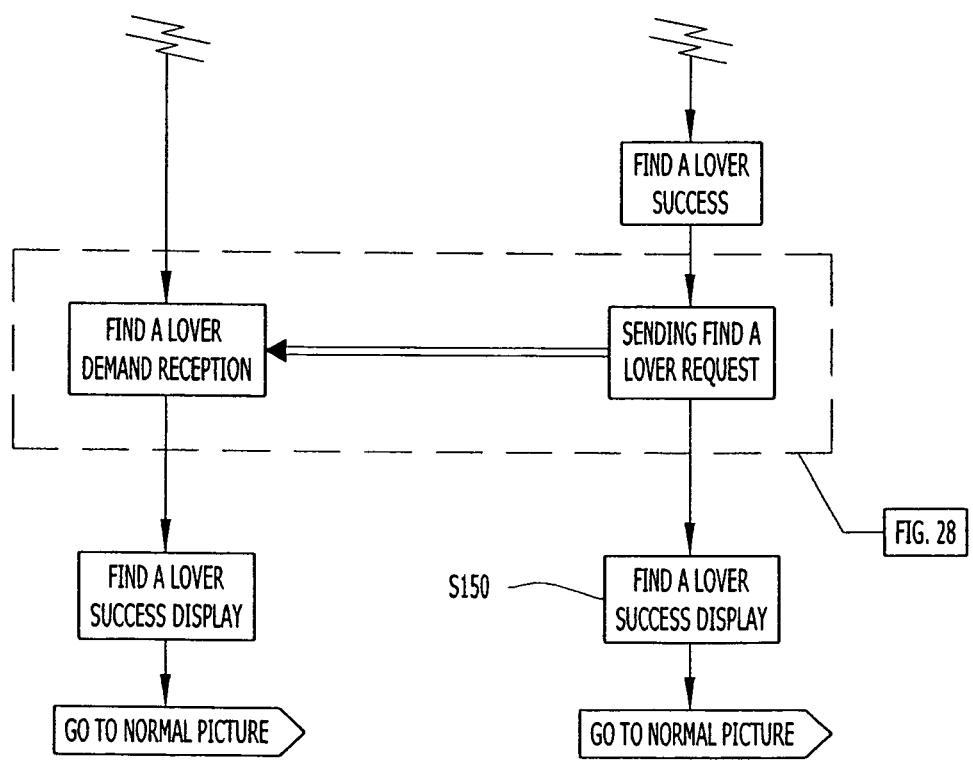

As a result of the determination of the sex (male/female) of the partner device (Step S16), if it is determined that the communication partner has the opposite sex, the process goes to the "find-a-lover" lottery process (Step S17) shown in FIGS. 26A and 26B.

In the "find-a-lover lottery" process, comparison data are first transmitted from the sending game device to the partner device (receiving game device) (Step S120). The "comparison data" refers to the "friendship level" data between the virtual living object of the partner device and the virtual living object of the player's game device memorized in the communication partner memory part. As explained above in connection with FIG. 11C, the "friendship level" is a parameter which is provided for every partner and varies depending on the contents of the past communications. If the "friendship level" of the sending game device is received (Step S121) by the receiving game device, the "friendship level" of the sending game device is compared with "friendship level" stored in the player's game device and a "bilateral relationship" will be acquired (Step S122). The "relationship" (bilateral relationship) is determined according to the friendship level with the partner device as shown in FIG. 11C. When the friendship level is 1%-20%, the relationship is defined as "an acquaintance" and 21%-60% as a "friend", 61%-80% as a "close friend" and 81%-100% as a "best friend". The relationship between opposite sexes which is 81%-90% rating is defined as a "sweetheart", and 91%-100% rating as an "ardent lover". The relationship drawn from the friendship level sent from the sending game device is compared with the friendship level which has been memorized in the receiving game device and is acquired as "bilateral relationship comparison data" (Step S123).

Figure 28:
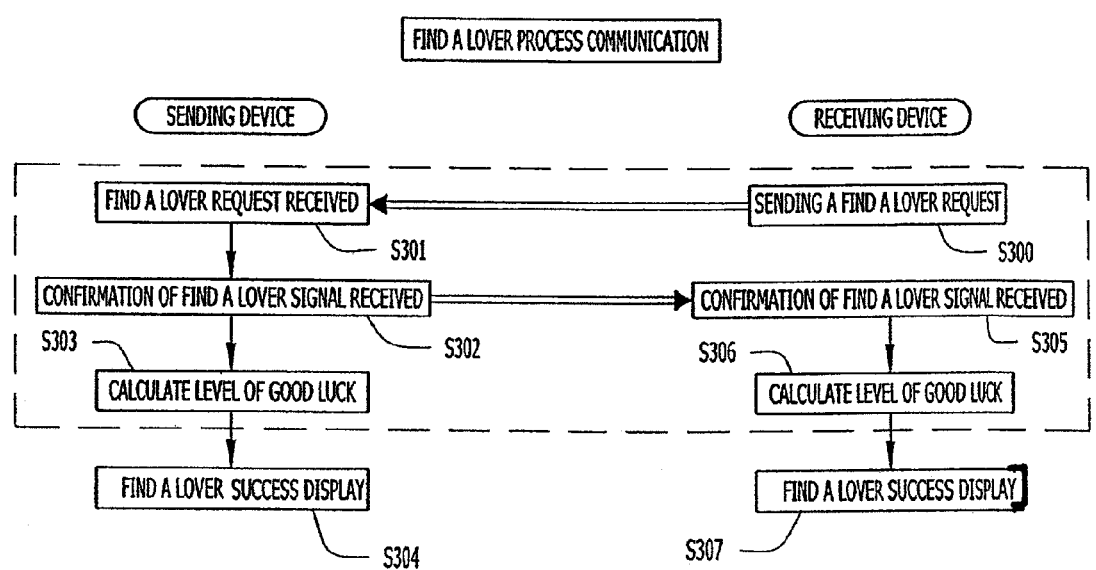
FIG. 28 is a flow chart of the "find-a-lover" processing steps of the communication game device of the present invention.
Figure 29:
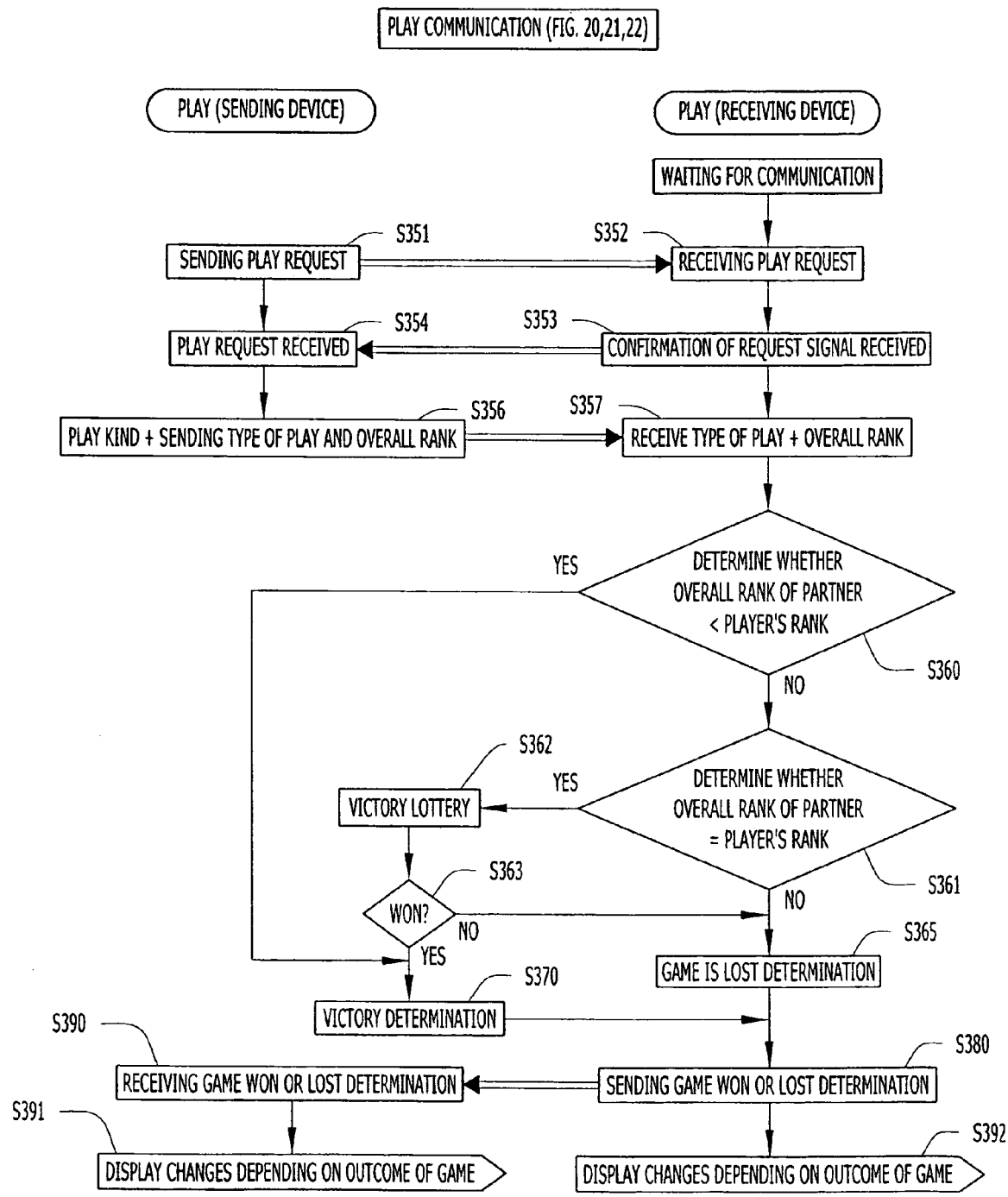
FIG. 29 is a flow chart of the "play communication" processing steps of the communication game device of the present invention.

Next, a determination is made whether the relationship is an "ardent lover" (Step S124). If the relationship is determined to be "ardent lover", the process goes to the step "find-a-lover success" (Step S150) where the "find-a-lover communication process" explained in FIG. 28 is performed followed by a display showing a predetermined picture.

If the relationship is determined not to be an "ardent lover" in step S124, a determination is made whether the relationship is more than a "sweetheart" relationship (including the case where one side is an "ardent lover" while the other side is a "sweetheart") (Step S125). If a decision is made that the relationship is more than "sweetheart" ("the friendship level" is 81%-90% between the opposite sexes), the process goes to the Step S128 where a decision is made whether the relationship is a "find-a-lover success" (Step S150) as explained above by a 70% probability or it is determined to be a "find-a-lover failure" (Step S129) (by the lottery).

Figure 27:
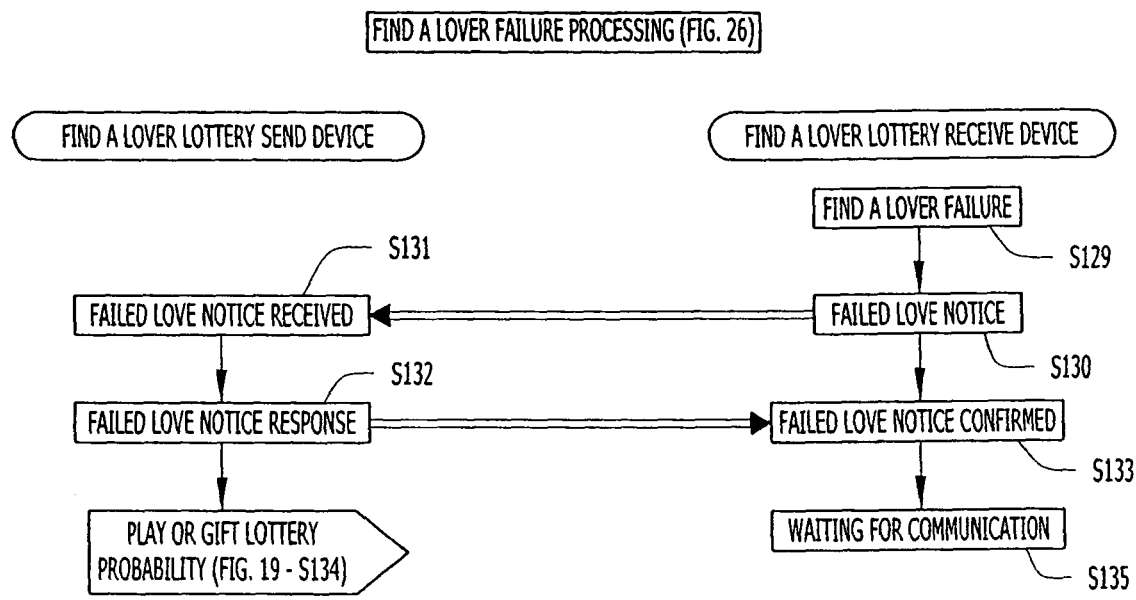
FIG. 27 is a flow chart of the "failure to find-a-lover" processing steps of the communication game device of the present invention.

If the process goes to "find-a-lover failure" (Step S129), a "failed love notice" process (Step S130) as shown in FIG. 27 will be performed. If the process comes to the "find-a-lover failure" (Step S129), a "find-a-lover failure notice" (Step S130) is sent to notify the partner (original sender) of the failed love and the partner game device performs the process of "find-a-lover failure confirmation" (Step S132).

After performing the "find-a-lover failure confirmation" process (Step S132), the sending game device performs a "find-a-lover failure confirmed" process in which the sending device notifies the receiving device of having received the notice of a "failed love" attempt, then the process shifts to the "play or gift lottery probability" determination (Step S134) (See FIGS. 19A and 19B for details). In the receiving game device, the step of "find-a-lover failure confirmed" (Step S133) is performed, and then moves to a stand-by process (the "waiting for reception" step S135).

The case will be explained below where a lover is determined in the "find-a-lover determination" (Step S128) in the above-mentioned "find-a-lover lottery".

If the find-a-lover lottery is a success, Step S150 "find-a-lover success" in the "find-a-lover processing" is performed as shown in FIG. 28. In the "find-a-lover processing", the receiving device sends a "find-a-lover request" to the sending device (Step S300). The sending device receives the above-mentioned "find-a-lover request" (Step S301), sends a "find-a-lover request received" signal to notify the receiving device of having received the "find-a-lover request" (Step S302), and then performs the step of "find-a-lover success display" (Step S304) to show the find-a-lover success. The receiving device receives the "find-a-lover request received" signal (Step S305) and deals with the performance of the step of "find-a-lover success display" (Step S307) to show the find-a-lover success (Step S307).

The "play or gift lottery probability" (Step S134) will now be explained. The contents of the "play or gift lottery probability" are the steps following a "50% probability determination" shown in FIGS. 19A and 19B.

As shown in FIGS. 19A and 19B, when "find-a-lover" fails, the process goes to the Step S134 where a determination is made whether the communication game device performs in a "play mode" (a "tug-of-war" game, "balloon" game, or a "quick eating competition" game) or a "gift" mode depending on the 50% probability (Step 134).

Figure 21:
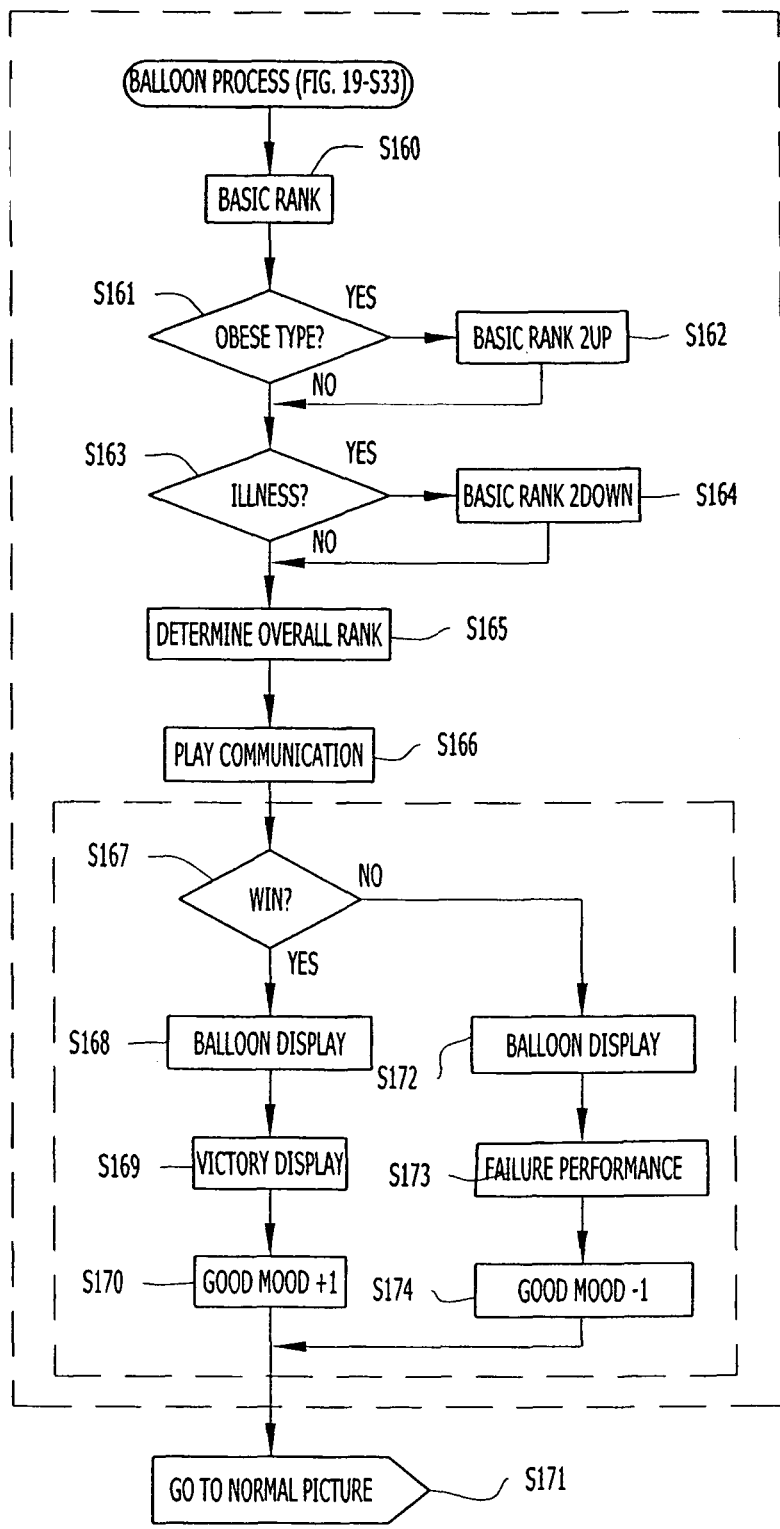
FIG. 21 is a flow chart showing the "balloon" game process steps in the communication game device of the present invention.
Figure 22:
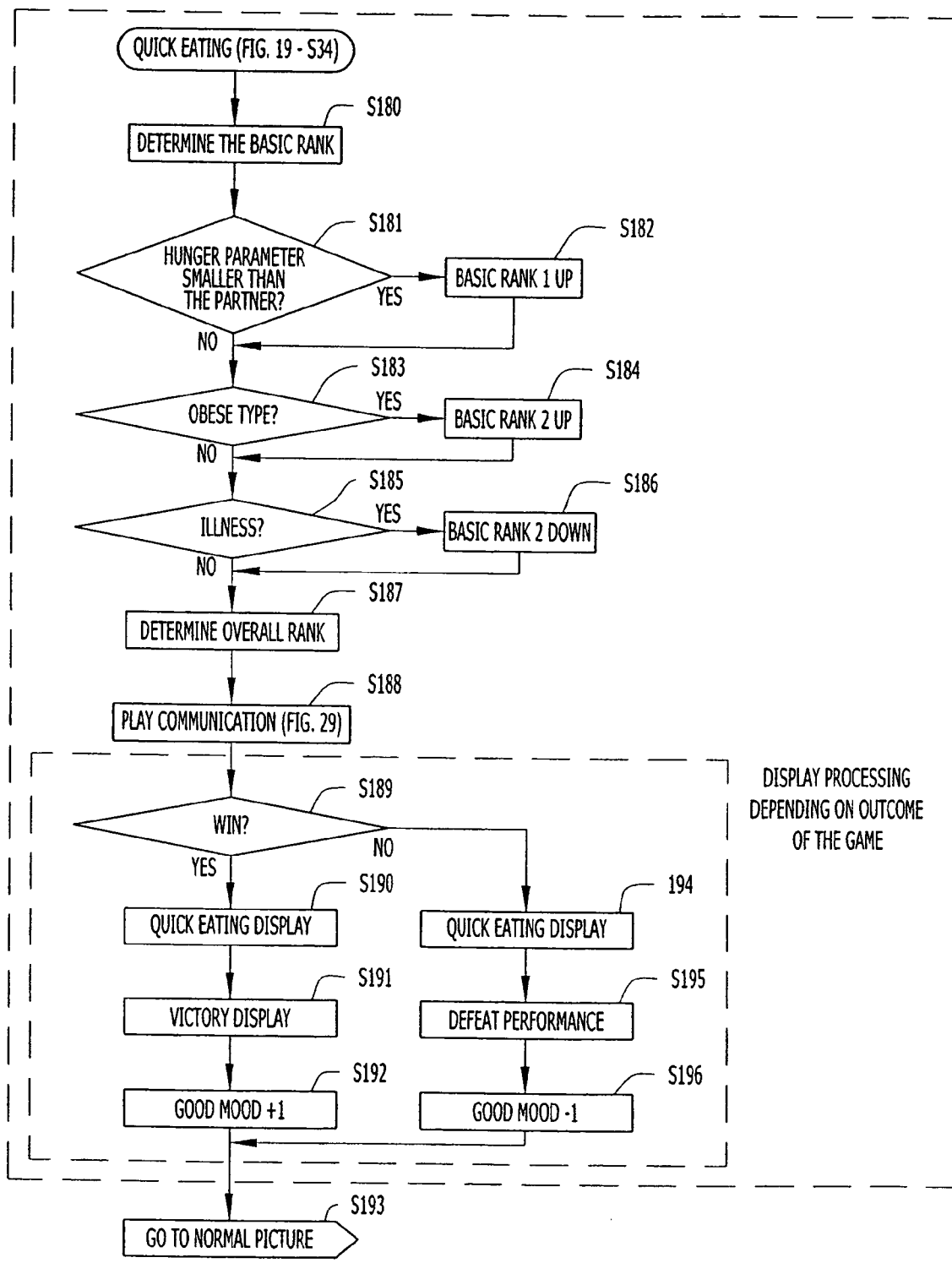
FIG. 22 is a flow chart showing the "quick-eating" game process steps in the communication game device of the present invention.

If the process goes to the "play mode" by the 50% probability, the "friendship level" will increase by 5 points (Step S30), and then it goes to the Step S31 where a decision will be made by a ⅓ probability whether to perform a "tug-of-war" game (Step S32), a "balloon" game (Step S33), or a "quick eating" game (Step S34). If the process shifts to the "tug-of-war" game based on the probability, the game device performs the process shown in FIG. 20, or the "balloon" game as shown in FIG. 21 or the "quick eating" game as shown in FIG. 22.

Figure 23:
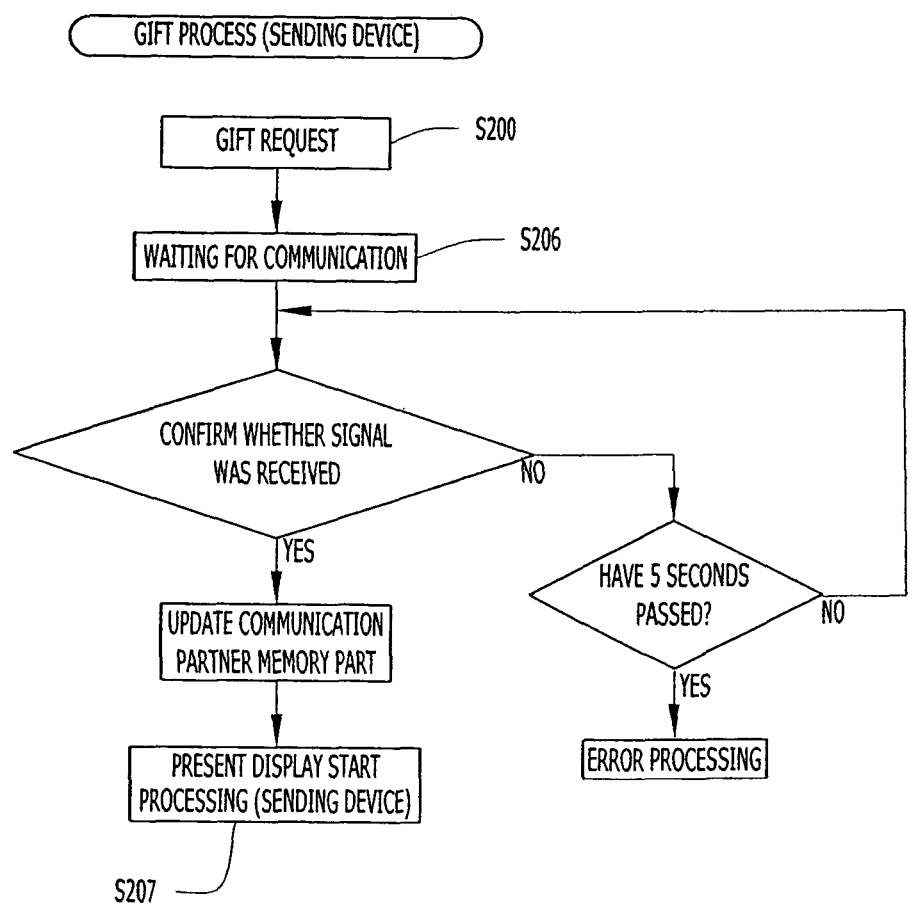
FIG. 23 is a flow chart showing the "gift" processing steps in the sending communication game device of the present invention.
Figure 24:
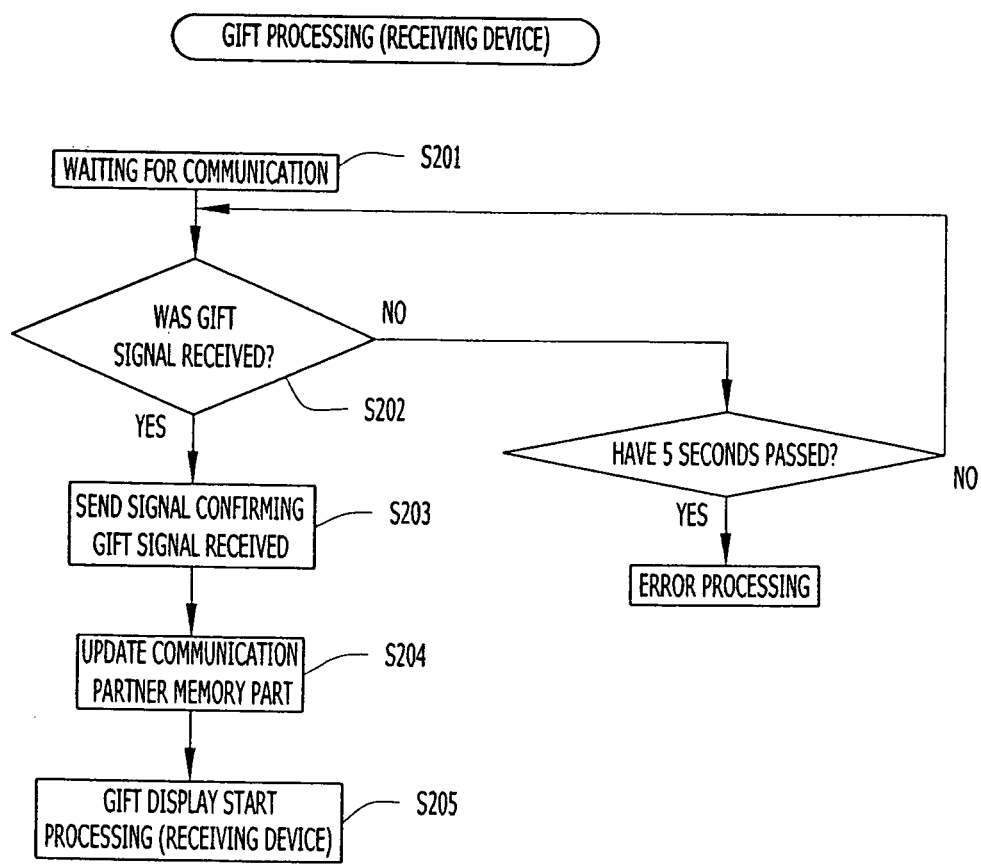
FIG. 24 is a flow chart showing the "gift" processing steps in the receiving communication game device of the present invention.
Figure 30:
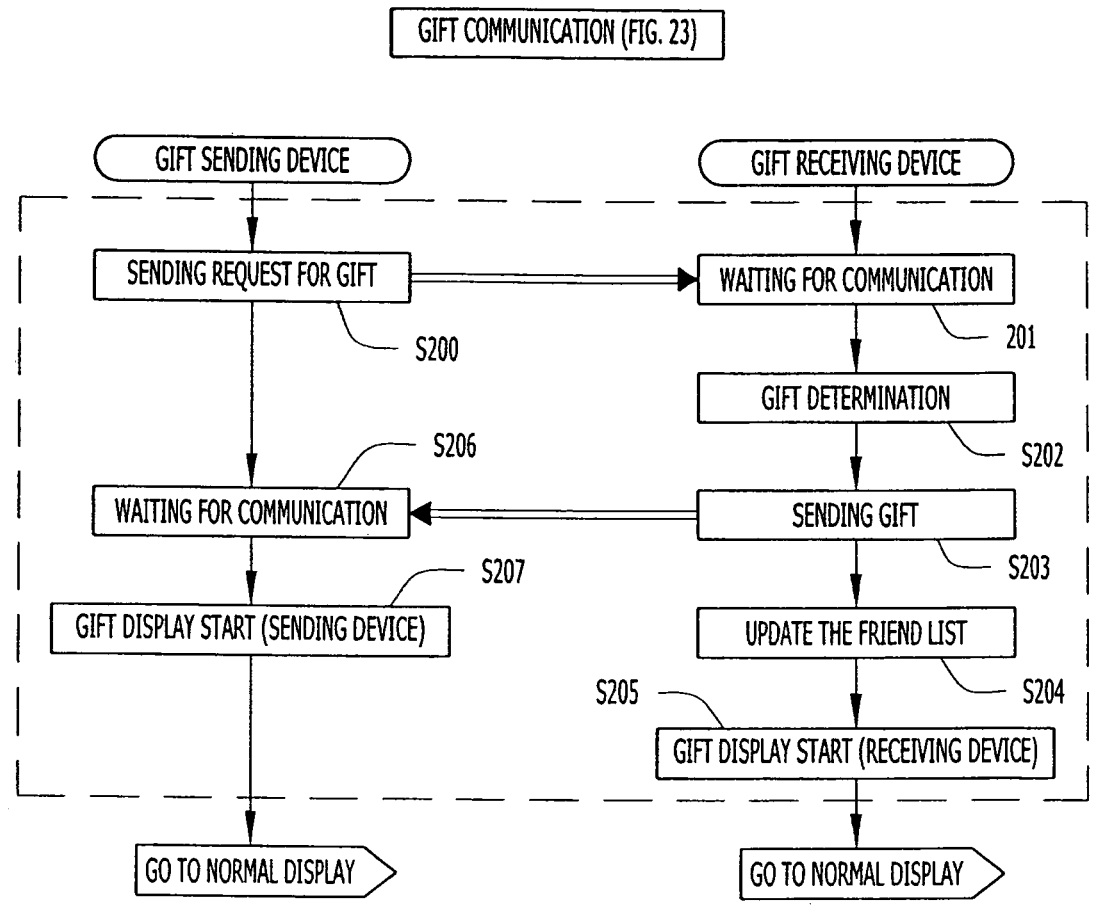
FIG. 30 is a flow chart of the "gift communication" processing steps of the communication game device of the present invention.

If the process shifts to "gift" processing in the Step S134, the "friendship level" increases by 5 points (Step S35), and the "gift" process (Step S36) shown in FIGS. 23, 24 and 30 is performed.

Hereinafter, the process concerning the "tug-of-war" game, the "balloon" game, the "quick eating" game, and "gift" process will be explained.

Figure 20:
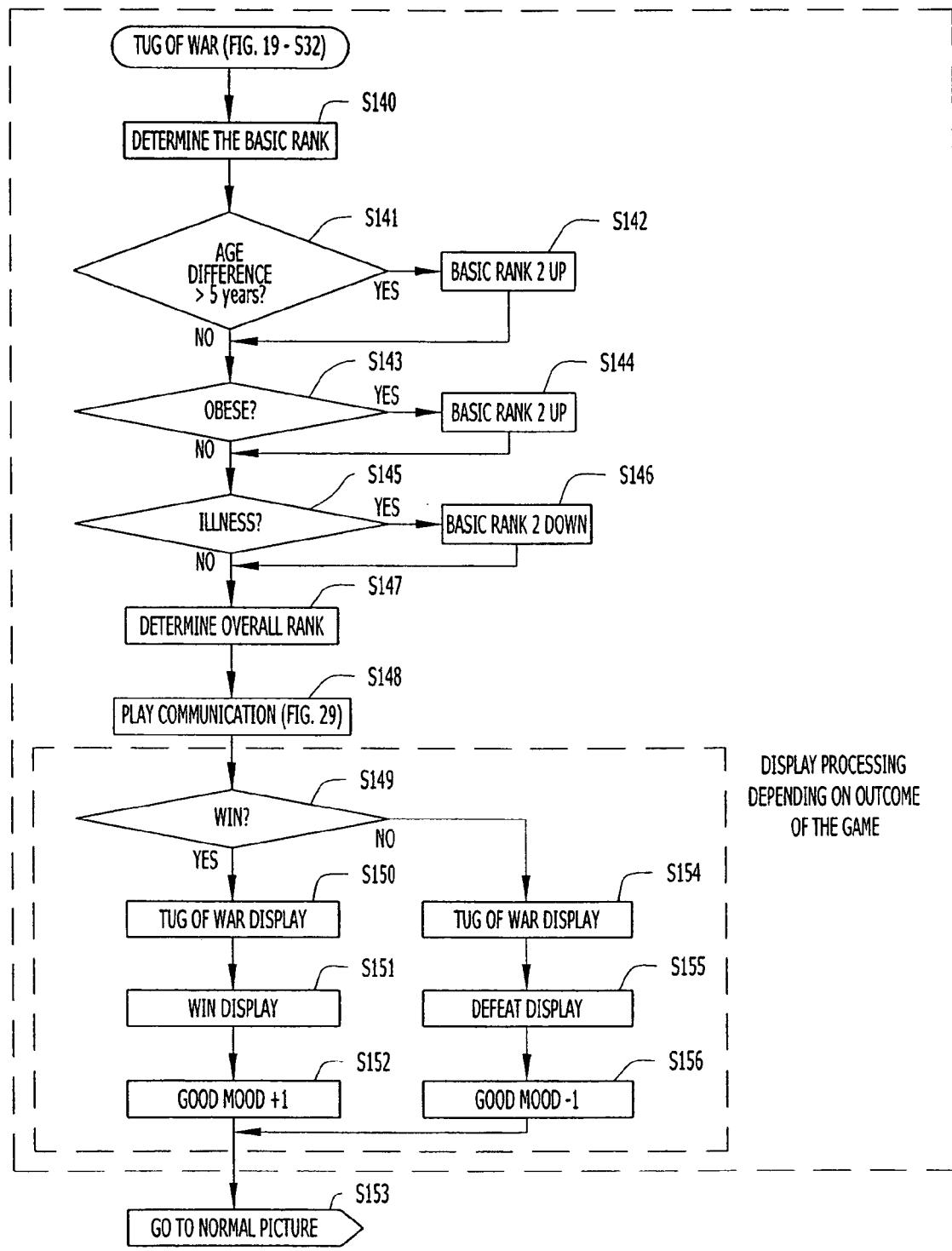
FIG. 20 is a flow chart showing the "tug-of-war" game processing steps in the communication game device of the present invention.

FIG. 20 is a flow chart showing the "tug-of-war" game process. In the "tug-of-war" process (Step S32), a "basic rank" is determined first (Step S140). The processing is the same as the victory-or-defeat rank as explained above in connection with the victory-or-defeat conditions shown in FIG. 10 and is determined by the number of miscounts or mistakes in care of the virtual living object.

Next, the age difference with the partner device is determined (Step S141). If the age difference is 5 years or more, the basic rank goes up by two (Step S142), and if age difference is less than 5, a basic rank remains the same and the process shifts to the next "obese type" determination (Step S143).

The obese type indicates the shape of the image display of the virtual living object and is determined to be either an obese type or a normal type according to its body weight. In Step S143, a determination is made between the "obese type" or the "normal type". In the case of the obese type, the basic rank goes up two ranks (Step S144). In the case of the normal type, the basic rank remains the same and the process goes to the next step to make an "illness?" determination (Step S145). In the case of an illness, the basic rank goes down two ranks (Step S146). Then the "overall rank" is determined based on the addition or subtraction of the above-mentioned basic rank (Step S147).

After the "overall rank" is determined, the process for communication with the partner device is shown in the "play communication process" (FIG. 29), since the process common to both the "balloon" game and the "quick eating" game is performed (Step S148).

In the "play communication" (Step S148), the receiving device performs a victory/defeat determination. The result of the process is transmitted to the sending game device. The contents of the "play communication" process will be explained with reference to FIG. 29.

After the above "overall rank" is finally determined, "sending play request" is performed by the sending game device to the receiving game device (Step S351). Since the receiving game device is in a "waiting for communication" state, it receives "play request" signal (Step S352) and confirms the "play request received" to notify the partner device of the reception of the "play request" (Step S353). Upon reception of a "play request confirmed" signal (Step S354), the sending game device performs "play kind+overall rank transmission" (Step S356) which includes transmission of the information about the "play kind" and the "overall rank".

Upon reception of the "play kind" and the "overall rank" (Step S357), the receiving game device performs a determination process where a victory/defeat determination for sending and receiving game devices will be made. The overall rank of the receiving device is determined by the receiving game device which received the "play kind" following the same process as Steps S140-S147 explained in the process performed in the sending game device shown in FIGS. 19A and 19B. That is, the overall rank is determined as follows: if the receiver's age is 5 years or older than the sender's device, the basic rank determined by the number of mistakes goes up two ranks; if the virtual living object is of obese type, the rank goes up 2 ranks; and if sick, the overall rank goes down two ranks. After determining the overall rank of the receiving game device, the overall rank is compared with the sending game device (Step S360). In the comparison, when the overall rank is higher than the sending device, a "victory determination" (Step S370) is performed to show the receiving game device won, and the information is transmitted which shows that the receiving game device won over the sending game device as a "game won or lost determination" (Step S380). The sending device then receives the "game won or lost determination" in the "game won or lost determination" (Step S390), and it performs a "display process" depending on victory or defeat (Step S391) as shown in FIG. 20. Similarly, the receiving game device performs a "display process" depending on a victory or a defeat (Step S392) after performing the "game won/lost determination" (Step S380).

As a result of the comparison (Step S360) of the overall rank, when the overall rank of the partner device is not higher than the overall rank of the player's game device, a determination is made whether the overall rank is the same (Step S361). If it is determined that both overall ranks are the same, a "victory-or-defeat lottery" (Step S362) is performed to determine which partner wins with a 50% probability. If it is determined that the receiving game device wins in the process (Step S363) then a "victory determination" (Step S370) is made and the information showing that the receiving game device won over the sending game device is transmitted in the "game won/lost determination" (Step S380).

Similarly, the receiving game device performs a "display process" depending on a victory or a defeat (Step S392) after performing the "game won/lost determination" (Step S380).

As a result of the comparison (Step S360) of the overall rank, if the overall rank of the partner device is higher than the overall rank of the player's game device, a "defeat determination" (Step S365) is performed to determine that the receiving game device lost the game and the information is transmitted showing that the receiving game device lost to the sending game device in the "game won/lost determination" (Step S380).

The above is the outline of the "play communication" process and the same communications and game won/lost determination processes are performed also in the "balloon" game and the "quick eating" game.

Upon reception of the "game won/lost determination", the process branches depending on whether the player's game device has won or lost (Step S149).

If a victory determination is made in the Step S149, a "tug-of-war" display (Step S150) and the victory display (Step S151) are shown, and the "good mood" parameter is increased by one (Step S152), and the display returns to the normal picture (Step S153).

If a game lost determination is made in the Step S149, a "tug-of-war" display (Step S154) and the defeat display (Step S155) are performed, and the "good mood" parameter is decreased by one (Step S156), and the display returns to the normal picture (Step S153).

FIG. 21 is a flow chart showing the "balloon" game process. In the "balloon" game process (Step S33), the "basic rank" is determined first (Step S160).

Next, the "obese type" determination (Step S161) is performed, and if determined to be obese, the basic rank goes up two ranks (Step S162). If it is determined not to be obese ("normal"), the basic rank remains unchanged and the next "illness ?" determination (Step S163) is performed. As a result of the "illness?" determination, if illness is determined, the basic ranks goes down two ranks (Step S164). If "no illness" is determined, the basic rank remains unchanged, but a process is performed to determine the overall rank (Step S165). After determining the overall rank, communications with the partner device as shown in the "play communications processing" (FIG. 29) which are common to both the "tug-of-war" game and the "quick eating" game are performed (Step S166).

Similar to the above the "tug-of-war" game, in the "play communication" process (Step S166), the receiving device performs a victory/defeat determination. The result of the process is transmitted to the sending game device. Upon reception of the "game won/lost determination", the process branches depending on whether the player's game device has won or lost (Step S167).

When the player's game device wins the game in Step S167, a "balloon" display is shown in Step S168, the victory display is performed (Step S169), one point is added to the "good mood" parameter (Step S170) and the display returns to the normal picture (Step S171).

If the game is determined to be lost, the "balloon" display is performed (Step S172) and then failure performance is displayed (Step S173), one point is added to the "good mood" parameter (Step S174), and then the display returns to the normal picture (Step S171).

FIG. 22 is a flow chart showing the "quick-eating" game process. In the "quick-eating" game process (Step S34), the "basic rank" is determined first (Step S180).

Next, the "hunger parameter" determination is performed (S181). If the parameter is determined to be lower than the hunger parameter of the game partner device, the basic rank is raised by one rank (Step S182). If the hunger parameter is determined to be higher than the parameter of the game partner device, the basic ranks remains unchanged and an illness determination is performed (Step S185).

As a result of the "illness?" determination, if an illness is determined, the basic rank goes down two ranks (Step S185). If "no illness" is determined, the basic rank remains unchanged, but a process is performed to determine the overall rank (Step S187). After determining the overall rank, communications with the partner device as shown in the "play communication" process (FIG. 29) which are common to both the "tug-of-war" game and the "quick eating" game processes are performed (Step S188).

Similar to the "tug-of-war" game, in the "play communication" process (Step S188), the receiving device performs a victory/defeat determination. The result of the process is transmitted to the sending game device. Upon reception of the "game won/lost determination", the process branches depending on whether the player's game device has won or lost (Step S189).

If the game is determined to be won in Step S189, the "quick-eating display" is performed in Step S190 and the "victory display" is performed in Step S191 and one point is added to the "good mood" parameter (Step S192). Then the display returns to the normal picture (Step S193).

If the game is determined to be lost in Step S189, the "quick-eating performance" is displayed in Step S194 and the "game defeat" is displayed (Step S195), one point is subtracted from the "good mood" parameter (Step S196) and the display returns to the normal picture (Step S193).

Next, the "gift" process will be explained. The "gift" process is performed following the "play or gift lottery probability" (Step S134) which was described in connection with the "find-a-lover failure" flow shown in FIGS. 19A, 19B and 27. This process is selected by the sending device with a 50% probability after the "find-a-lover failure" decision. If the "gift" process is selected with a 50% probability, the "friendship level" will be increased by 5% (Step S35), then the process goes to the "gift" process (FIGS. 19A and 19B and Step S36).

The communications between the sending game device and the receiving game device in the "gift" process will be explained with reference to FIG. 30. If the process shifts to the "gift" process, a "gift request transmission" is performed for the receiving game device (Step S200). The receiving game device is put in the communication waiting state (waiting for communication, Step S201) after the "failed love notice confirmed" (FIG. 27, Step S133). On receiving the "gift request transmission", the receiving device performs the "gift determination" process (Step S202). An outline of available presents was explained with reference to FIG. 11. If the sending game device performs the "gift request transmission" (the gift sent to the receiving game device is undecided at this moment), the gift which will be given to the receiving game device will be determined based on the conditions shown in FIG. 11. After the decision is made, "sending signal confirming gift signal received" (Step S203) is performed and the information about the "gift determination" is sent from the receiving game device to the sending game device. After sending the "gift confirmation" signal, the receiving device performs "update the communication partner memory part"

(Step S204) including changes to the "friendship level" based on the gift determined and performs a "gift display start" process (Step S205) to display pictures showing the gift that is being given. After the picture is shown, the display returns to the normal picture.

The process of the sending game device during the above "gift" process is described in more detail in FIG. 23. In the figure, the same reference numerals denote the same steps shown in FIG. 30 and described above.

If the "gift request transmission" (Step S200) is performed and the process comes to the "waiting for communication" process (Step S206), a decision is made whether there was a "gift confirmation signal" from the receiving game device. If the "gift confirmation signal" is received during the "waiting for communication" stage, the "gift confirmation reception" process is performed, "update the friend list" and "gift display start" processes (Step S207) are performed. The display the returns to the normal picture.

After 5 seconds have passed during the "waiting for communication" step (Step 206) with no "gift confirmation" transmission from the receiving device, the process proceeds to "error processing" where the normal picture is displayed.

FIG. 24 shows the detailed "gift process" performed by the receiving device. The numerals used in the figure denote the same steps with the same numerals as used in FIG. 30.

The receiving game device performs, following the step of "failed love notice confirmed" (Step S133 in FIG. 27) at the "waiting for communication" step (Step S201), a determination whether the "gift" request transmission from the sending game device was received within 5 seconds ("gift request reception"). If "gift request reception" is not performed within 5 seconds, the process returns to the "error processing" process and the "normal picture" is displayed. If "gift request reception" processing is performed within 5 seconds, a "gift confirmation signal" (Step S203), an "update a communication partner memory part" (Step S204), and "gift display start" process (Step S205) are performed as already mentioned.

Figure 31:
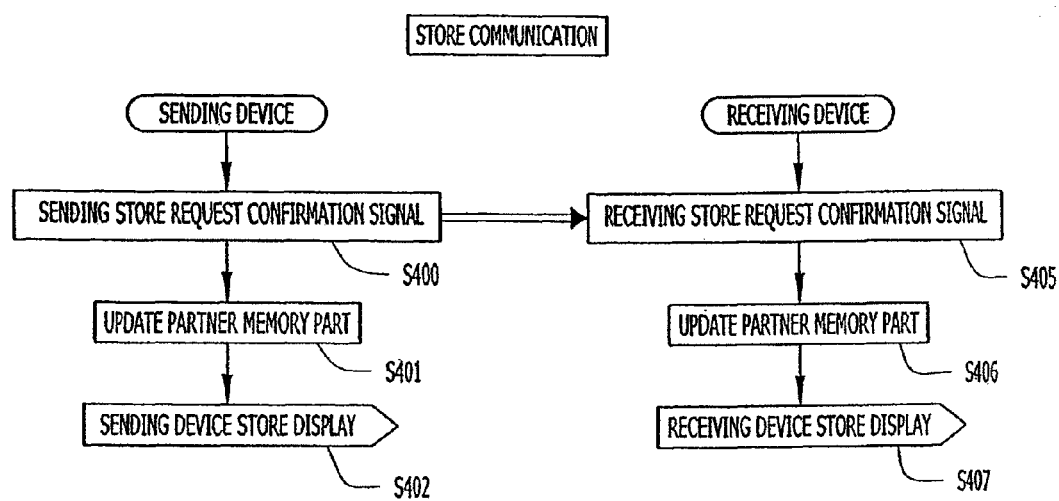
FIG. 31 is a flow chart of the "store communication" processing steps of the communication game device of the present invention.

Next, the store communication process will be described with reference to FIG. 31. The store communication process is a determination process mentioned above in connection with Step S13 of FIGS. 19A and 19B and the process branches thereafter. Whether the process transfers to "store communication process" is based on the contents of the "recognition code" of the initial communication data transmitted and received in the initial communication process shown in FIGS. 18 and 25.

The "recognition code" refers to information for identifying the device which serves as a communication partner. As shown in FIG. 33, the information includes 15 items denoted as VER 1-VER 15. If the "recognition code" is VER 1, the device which received the "recognition code" recognizes that the communication partner is a device installed in a store.

The "device installed in the store" is a device installed in a store which is capable of communicating with the communication game device of the present invention. The device installed in a store is provided with functions and information which are not given to the usual communication game device.

The pictures to be displayed and the various programs performed after the "device installed in the store" and the communication game device of the present invention communicate with each other are memorized beforehand in the communication game device. These pictures and programs are appropriate for the "device installed in the store" and are not displayed or performed until the communication game device acquires the "recognition code" VER 1 in the initial communication process.

The contents of the communication processes will now be explained. If the process shifts to the store communication process, a "sending store request confirmation" signal will be transmitted from the sending game device (Step S400). Since the "basic communication data transmission" has already been exchanged in the initial communication before the store communication process starts, the sending game device has already acquired the information on the communication apparatus currently installed in the store. Based on the information included above the "basic communication data transmission", the sending device performs the step of "updating the communication partner memory part" (Step S401), looks up the data proper for the store communication apparatus stored in the memory, and displays a picture as "sending game device store display" (Step S402).

The store communication apparatus performs a "receiving store request confirmation" process (Step S405) where the apparatus receives the communication concerning the "sending store request confirmed" of the sending game device. Similar to the processing in the sending game device based on the information included above "initial communication data transmission", the apparatus then performs the "update the communication partner memory part" (Step S406), and displays a picture as "receiving game device store display" (Step S407).

Now the contents of the "update/store the communication partner memory part" process (FIGS. 19A and 19B and Step S15) will be explained below with reference to FIG. 32. After processing of the "recognition code version check" (Step S12) and "store?" (Step S13) shown in FIGS. 19A and 19B have been properly completed, the sending device determines a "communication success" (Step S501), and acquires information required for the step to "update/store the communication partner memory part" including the "ID", "name code", "character number", "sex" and "no mystery" in the "partner data acquisition" process (Step S502) based on the information acquired by the initial communication process (FIG. 25).

Since the decision on whether the communication partner is a new one or the one who was communicated with in the past is performed following the "acquiring partner data" process (Step S502), the "name code" memorized in the communication partner memory part is scanned, and the code is matched up with the "name code" acquired by the "partner data" acquisition processing S502 ("is name code identical?" process) to determine whether the data is the same (Step S503). If both codes are identical, the process goes to a determination on whether the "ID" is also identical ("ID identification" process, Step S504). If the "ID" is identical, a decision is made that the communication partner is one of those who communicated with in the past and the "memory update" step should be performed where the "character number" memorized corresponding to the "ID(s)" is replaced by the "character number" obtained in the "partner data acquisition" process S502 and one point will be added to "the number of encounters" (Step S505). Then the display returns to a normal picture (Step S506).

In the "ID identical?" process (Step S503) mentioned above, and the "name code identical?" process (Step S504), if a partner who had not communicated in the past is identified (where no identical "ID" is found or an identical "ID" is found but the "name code" is not identical), the "add new data" process is performed to the communication partner memory part. First, the number of the communication partners who have been memorized in the communication partner memory part is checked. The memory area in the communication partner memory part is large enough to store information about a number of communication partners, for example, 20.

If the number of communication partners exceeds 20, the information is added based on the new communication and the information about one of the communication partners who has already been memorized based on the predetermined conditions is deleted. Following Step S504, the number of the communication partners is checked (Step S510). If the number is less than the maximum allowable number, the process goes to Step S511 "memory update" where the data including the "name code", a "character number", "sex" and "no mystery" are stored corresponding to the newly obtained "ID" and one point is added to the "number of encounters". The display then returns to the normal picture.

If it is determined that the number exceeds the maximum number in the Step S510, the partner information already memorized in the communication partner memory part is scanned and the partner with the lowest "friendship level" is selected (Step S512). In this process, if the partner with the lowest "friendship level" cannot be found, the oldest data is selected (Step S513) and the data is deleted (Step S514). Subsequently, the new communication partner's data is memorized (Step S515) ("store new data").

Next, the method for deciding the character picture used in the "gift" display and "find-a-lover" display that show the communication partner's virtual living object will be explained below. If the information on the "version" (memory picture code) exchanged in the initial communication process is identical on both sides, the character picture in accordance with the "character number" obtained in the initial communication process is fetched. If the information on the "version" is not identical on both sides, the kinds of character pictures memorized in the image storage section may differ, or the character pictures may differ even if these pictures have the same "character number". In those case where the "version" of the sending device and the receiving device are found to be different after the "version" of a communication partner and the player's game device were compared, the communication game device of the present invention displays the "mystery mark" having the character number "16" indicating that the memory picture code is not identical.

When the "memory picture code" of the communication partner who communicates for the first time differs from the "memory picture code" of the player's game device, the "no mystery" parameter for the communication partner is set to "0" (i.e., "mystery") in the steps of "add or renew memory" processing in the "add/renew memory" process. After this setting, when the friend list is displayed, the "mystery mark" of a character number "16" is displayed as the virtual living object of the communication partner.

DESCRIPTION OF THE REFERENCE NUMERALS

1 Main part of the communication game device (main part)
3 Liquid crystal display
5 Display element
7 A switch
9 B button
11 C button
13 Icon
15 Icon
17 Light emitting device
19 Light receiving device
21 Microcomputer
23 EEPROM
25 battery
27 clock signal generating means
29 reset switch
31 buzzer

What is claimed is:

1. A communication game device comprising:
a data processing section,
a program storage section for storing a control program for controlling said communication game device,
an image storage section for storing a picture ID and a character picture associated with the picture ID,
a controlling element operated by a game player,
a parameter storage section for storing parameters including the picture ID, a device ID given by said data processing section to said communication game device based on the control program, and a name code given by the game player using said controlling element,
a displaying element for displaying the character picture retrieved by said data processing section from said image storage section corresponding to the picture ID stored in said parameter storage section,
a communicating element capable of transmitting the parameters stored in said parameter storage section to another communication game device as information of said communication game device and receiving parameters transmitted from another communication game device as received information of said another communication game device,
a communication partner memory section for storing the information of said another communication game device, the information including a picture ID, a device ID, and a name code that are received by the communicating element, and a friendship level, the friendship level being between a virtual living object of said another communication game device and a virtual living object of said communication game device of the game player,
wherein said data processing section is capable of:
controlling the communication game device based on the control program stored in said program storage section so as to display an information list including the information of another communication game device stored in said communication partner memory section,
determining whether said communication partner memory section has previously-stored information including a device ID and a name code that are identical with a device ID and a name code in the received information of another communication game device,
updating the friendship level in the information including the device ID and the name code that are identical with the device ID and the name code in the received information of said another communication game device if said data processing section determines that said communication partner memory section has the previously-stored information including the device ID and the name code that are identical with the device ID and the name code in the received information of said another communication game device, and
storing the received information of said another communication game device in said communication partner memory section if said data processing section determines that said communication partner memory section does not have the previously-stored information including the device ID and the name code that are identical with the device ID and the name code in the received information of said another communication game device.

2. The communication game device as defined in claim 1, wherein said image storage section further comprises:

a code memory section for storing a player's memory picture code which is determined according to a type of character picture and the relationship between the picture ID and the character ID, and a section for storing a memory code mismatch image, wherein said communicating element is further capable of transmitting the player's memory picture code stored in said code memory section along with the parameters stored in said parameter storage section to another communication game device, wherein said communicating element is further capable of receiving a partner's memory picture code transmitted by the another communication game device, wherein said data processing section is further capable of:

comparing the player's memory picture code stored in said code memory section with the partner's memory picture code, retrieving a character picture which corresponds to an ID received by said communicating element from said image storage section to display a picture of a virtual living object of the another communication game device if the partner's memory picture code is identified with the player's memory picture code stored in said code memory section, and retrieving the memory code mismatch image from said image storage section to display as the virtual living object on said displaying element if the partner's memory picture code is not identified with the player's memory picture code stored in said code memory section.

3. The communication game device as defined in claim 1, wherein said communicating element further includes an infrared ray emitting element and an infrared ray receiving element capable of receiving data transmitted by another communication game device.

4. The communication game device as defined in claim 1, wherein said communication partner memory section is an EEPROM.

5. The communication game device as defined in claim 1, wherein said controlling element includes a plurality of spaced apart buttons.

6. The communication game device as defined in claim 1, wherein said displaying element is a liquid crystal display.

* * * * *